US011636526B2

United States Patent
Tang et al.

(10) Patent No.: US 11,636,526 B2
(45) Date of Patent: *Apr. 25, 2023

(54) VEHICLE IDENTIFICATION DRIVEN BY AUGMENTED REALITY (AR)

(71) Applicant: Capital One Services, LLC, McLean, VA (US)

(72) Inventors: Qiaochu Tang, The Colony, TX (US); Geoffrey Dagley, McKinney, TX (US); Micah Price, Anna, TX (US); Avid Ghamsari, Frisco, TX (US); Jason Hoover, Grapevine, TX (US)

(73) Assignee: Capital One Services, LLC, McLean, VA (US)

( * ) Notice: Subject to any disclaimer, the term of this patent is extended or adjusted under 35 U.S.C. 154(b) by 372 days.

This patent is subject to a terminal disclaimer.

(21) Appl. No.: 16/946,549

(22) Filed: Jun. 26, 2020

(65) Prior Publication Data

US 2021/0056611 A1 Feb. 25, 2021

Related U.S. Application Data

(63) Continuation of application No. 16/547,368, filed on Aug. 21, 2019, now Pat. No. 10,699,323.

(51) Int. Cl.
*G06Q 30/06* (2012.01)
*G06Q 30/0601* (2023.01)
(Continued)

(52) U.S. Cl.
CPC ..... *G06Q 30/0631* (2013.01); *G06Q 30/0627* (2013.01); *G06Q 30/0643* (2013.01); *G06T 15/00* (2013.01); *G06T 19/006* (2013.01)

(58) Field of Classification Search
None
See application file for complete search history.

(56) References Cited

U.S. PATENT DOCUMENTS 9,928,544 B1 * 3/2018 Hasan ..................... G06T 11/00
10,699,323 B1 6/2020 Tang et al.
(Continued)

FOREIGN PATENT DOCUMENTS

| RU | 136993 U1 * | 1/2014 |
| RU | 136993 U1 | 1/2014 |
| WO | 2009026726 A1 | 3/2009 |

OTHER PUBLICATIONS

M. -W. Chang and C. Collins, "Exploring entities in text with descriptive non-photorealistic rendering," 2013 IEEE Pacific Visualization Symposium (PacificVis), 2013, pp. 9-16, doi: 10.1109/PacificVis.2013.6596122 (Year: 2013).*

(Continued)

*Primary Examiner* — Michelle T Kringen
(74) *Attorney, Agent, or Firm* — Harrity & Harrity, LLP

(57) ABSTRACT

A device receives user rendering data for a 3-D rendering of a user. The 3-D rendering is a proportional representation of the user and the user rendering data is available via an application. The device determines user characteristics of the user. The device receives an indication that a user device has submitted a vehicle search request. The device identifies vehicles to recommend to the user based on an analysis of: the user characteristics, and vehicle characteristics for a collection of vehicles being offered via the application. The device causes vehicle description data for the vehicles to be displayed via an interface of the application. The device receives user interaction data that indicates a user selection of vehicle. The device causes, based on receiving the user interaction data, the interface of the application to display a placement of the 3-D rendering of the user into a 3-D rendering of the vehicle.

20 Claims, 11 Drawing Sheets

(51) Int. Cl.
*G06T 19/00* (2011.01)
*G06T 15/00* (2011.01)

(56) References Cited

U.S. PATENT DOCUMENTS

| | | |
|---|---|---|
| 2013/0013157 A1 | 1/2013 | Kim et al. |
| 2013/0219434 A1 | 8/2013 | Farrell et al. |
| 2014/0100997 A1 | 4/2014 | Mayerle et al. |
| 2014/0358738 A1 | 12/2014 | Ohnemus et al. |
| 2014/0365333 A1 | 12/2014 | Hurewitz |
| 2015/0220244 A1 | 8/2015 | Vats et al. |
| 2015/0363665 A1 | 12/2015 | Szasz |
| 2016/0055236 A1* | 2/2016 | Frank .................... G06F 40/35 707/748 |
| 2017/0368413 A1* | 12/2017 | Shavit .................. A61B 5/1123 |
| 2018/0281627 A1 | 10/2018 | Ali |
| 2020/0001173 A1* | 1/2020 | Jung ..................... G06F 3/0304 |

OTHER PUBLICATIONS

Apple Developer, "Scanning and Detecting 3D Objects", 5 pages, [Retrieved on Aug. 21, 2019] Retrieved from [URL: https://developer.apple.com/documentation/arkit/scanning_and_detecting_3d_objects].

Weiyin M, et al., "A hierarchically structured and constraint-based data model for intuitive and precise solid modeling in a virtual reality environment," Computer-Aided Design, 2004, pp. 903-928.

* cited by examiner

VEHICLE IDENTIFICATION DRIVEN BY AUGMENTED REALITY (AR)

RELATED APPLICATION

This application is a continuation of U.S. patent application Ser. No. 16/547,368, filed Aug. 21, 2019 (now U.S. Pat. No. 10,699,323), which is incorporated herein by reference.

BACKGROUND

Augmented reality (AR) may refer to a live view of a physical, real-world environment that is modified by a computing device to enhance an individual's current perception of reality. In augmented reality, elements of the real-world environment are "augmented" by computer-generated or extracted input, such as sound, video, graphics, haptics, global positioning system (GPS) data, and/or the like. Augmented reality may be used to enhance and/or enrich the individual's experience with the real-world environment.

SUMMARY

According to some implementations, a method may include receiving user rendering data for a three-dimensional (3-D) rendering of a user, wherein the 3-D rendering is a proportional representation of the user, and wherein the user rendering data is to be made available to an application that assists with vehicle purchases. The method may include determining, by processing the user rendering data, a set of user characteristics of the user. The method may include receiving an indication that a user device has submitted a vehicle search request. The method may include identifying a set of vehicles to recommend to the user based on an analysis of: the set of user characteristics, and a set of vehicle characteristics for a collection of vehicles being offered via the application. The method may include causing vehicle description data for the set of vehicles to be displayed via an interface of the application. The method may include receiving user interaction data that indicates a user selection of a particular vehicle of the set of vehicles. The method may include causing, based on receiving the user interaction data, the interface of the application to display a placement of the 3-D rendering of the user into a 3-D rendering of the particular vehicle, wherein the placement creates a visual that illustrates a degree to which the user is compatible with the particular vehicle.

According to some implementations, a device may include one or more memories, and one or more processors, operatively coupled to the one or more memories, configured to receive image data that depicts at least a portion of a user of an application that assists with vehicle purchases. The one or more processors may generate user rendering data for a three-dimensional (3-D) rendering of at least the portion of the user depicted in the image data, wherein the 3-D rendering is based on measurements of the user. The one or more processors may determine, by processing the user rendering data, a set of user characteristics of the user. The one or more processors may receive an indication that a user device associated with the user is accessing a search feature of the application. The one or more processors may identify a set of vehicles to recommend to the user based on a machine-learning-driven analysis of at least one of: one or more search parameters that the user device provided to the search feature of the application, the set of user characteristics, or a set of vehicle characteristics for a collection of vehicles being offered via the application. The one or more processors may cause vehicle description data for the set of vehicles to be displayed via an interface of the application. The one or more processors may receive user interaction data that indicates a user selection of a particular vehicle of the set of vehicles. The one or more processors may cause, based on receiving the user interaction data, the interface of the application to display a placement of the 3-D rendering of the user into a 3-D rendering of the particular vehicle, wherein the placement creates a visual that illustrates a degree to which the user is compatible with the particular vehicle.

According to some implementations, a non-transitory computer-readable medium may store one or more instructions. The one or more instructions, when executed by one or more processors of a device, may cause the one or more processors to receive user rendering data for a three-dimensional (3-D) rendering of a user, wherein the 3-D rendering is based on measurements of the user and is a proportional representation of the user, and wherein the user rendering data is to be made available to an application that assists with vehicle purchases. The one or more instructions may cause the one or more processor to determine, by processing the user rendering data, a set of user characteristics of the user. The one or more instructions may cause the one or more processor to integrate the set of user characteristics into a search feature of the application to permit the search feature to offer a set of search parameters that are customized to the user. The one or more instructions may cause the one or more processor to receive an indication that a user device associated with the user is accessing the search feature of the application. The one or more instructions may cause the one or more processor to identify a set of vehicles to recommend to the user, based on an analysis of: one or more search parameters that the user device provided to the search feature of the application, the set of user characteristics, and a set of vehicle characteristics for a collection of vehicles being offered via the application. The one or more instructions may cause the one or more processor to provide vehicle description data for the set of vehicles for display via an interface of the application. The one or more instructions may cause the one or more processor to cause the interface of the application to display a placement of the 3-D rendering of the user into a 3-D rendering of at least one vehicle of the set of vehicles, wherein the placement creates a visual that illustrates a degree to which the user is compatible with the at least one vehicle.

DETAILED DESCRIPTION

Figure 1A:
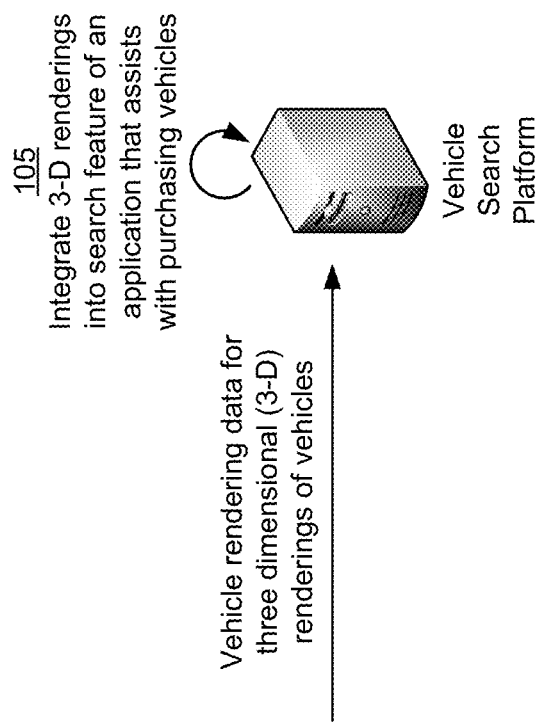
FIGS. 1A-1F are diagrams of one or more example implementations described herein.

The following detailed description of example implementations refers to the accompanying drawings. The same reference numbers in different drawings may identify the same or similar elements.

Augmented reality (AR) may be used to superimpose three-dimensional (3-D) representations of objects on a display of an image of an environment that is being captured (e.g., in real time). For example, a user may use a camera of a user device (e.g., a smartphone, a tablet, smart glasses, and/or the like) to capture video of the user's surroundings, and the user device (e.g., an AR application running on the user device) may superimpose a 3-D representation of an object on the image being captured by the user device.

In some cases, AR may be used to assist users in completing transactions for products and/or services (e.g., in purchasing and/or renting the products and/or services). For example, a user may use the Internet to engage in a transaction for a product. In some cases, the user may hesitate to complete the transaction because the user may want to perform an in-person inspection of the product. For example, if the user is searching for a vehicle, the user may need to sit inside one or more vehicles to make a determination as to which vehicle is a good fit for the user. If the user is searching for the vehicle via the Internet, the user may be deterred from completing the transaction for the vehicle. Furthermore, without a way for a vehicle search feature to identify optimal vehicles for the user, resources (e.g., processing resources, network resources, memory resources, and/or the like) of a user device and/or a server supporting the vehicle search feature may be wasted by producing sub-optimal search results that will not cause the user to complete the transaction for the vehicle.

Some implementations described herein provide a vehicle search platform to assist a user in searching for a vehicle by supporting a search feature of a vehicle search application with AR technology. For example, the vehicle search platform may use a three-dimensional (3-D) rendering of the user to identify a set of vehicles to recommend to a user and, after the user selects a vehicle, may cause an interface of the vehicle search application to display the 3-D rendering of the user within the 3-D rendering of the selected vehicle (e.g., by showing the 3-D rendering of the user sitting in a seat of the 3-D rendering of the vehicle). This may illustrate to the user a degree to which the user is compatible with the selected vehicle.

In this way, the vehicle search platform uses AR to identify optimal vehicles to recommend to the user and provides the user with an illustration that shows a degree to which the user is compatible with the selected vehicle. By identifying the optimal vehicles to recommend to the user, the vehicle search platform conserves resources that would otherwise be wasted processing vehicle data for other vehicles that are not a good fit for the user. Additionally, by providing the user with the illustration, the vehicle search platform allows the user to visualize the degree to which the user is compatible with the vehicle, which allows the user to make more informed purchasing decisions, thereby improving customer satisfaction, conserving resources of devices that would otherwise be used to return a purchased vehicle (e.g., due to the user not realizing that the vehicle does not fit properly until after the vehicle was purchased), and/or the like.

FIGS. 1A-1F are diagrams of one or more example implementations 100 described herein. For example, implementation(s) 100 may include a data storage device, a user device, and/or a vehicle search platform.

As shown in FIGS. 1A-1F, the vehicle search platform may use AR technology to support a vehicle search application in a manner that is able to assist a user in identifying a vehicle (e.g., that is to be purchased, rented, and/or the like). Additionally, while one or more implementations described herein are performed by the vehicle search platform, it is to be understood that this is provided by way of example. In practice, one or more of the implementations may be performed by the user device or by another device.

As shown in FIG. 1A, and by reference number 105, the vehicle search platform may integrate 3-D renderings of vehicles into a search feature of an application that assists with vehicle purchases (referred to hereafter as a vehicle search application). For example, the vehicle search platform may integrate 3-D renderings of vehicles, that are part of a collection of vehicles, into a search feature of the vehicle search application, such that a user accessing the search feature may view the 3-D renderings via an interface.

In some implementations, the vehicle search platform may host the vehicle search application. In some implementations, the vehicle search platform may support the vehicle search application. For example, the vehicle search application may be hosted by another device (e.g., a server external to the vehicle search platform). In this case, one or more functions and/or features provided by the vehicle search platform may be provided to the vehicle search application via a plugin and one or more application programming interfaces (APIs) or other types of communication interfaces.

In some implementations, the vehicle search application may include a set of search features that may assist users in searching for vehicles. The set of search features may include a search feature that allows users to input search parameters while searching for particular vehicles, a search feature that allows users to recommend specific user preferences, a search feature that allows users to search based on feedback information, and/or the like. In this case, a data structure may store vehicle data for the collection of vehicles that are searchable via one or more of the set of search features, such that the vehicle data may be displayed via an interface of the vehicle search application. The vehicle data for a vehicle may include a vehicle identifier for the vehicle, vehicle characteristics data that describes a set of vehicle characteristics of the vehicle, vehicle price data that indicates a price that is being offered for the vehicle, and/or the like.

In some implementations, the vehicle search platform may receive vehicle rendering data that depicts the 3-D renderings of the vehicles in the collection of vehicles. For example, an entity (e.g., an organization, an individual, and/or the like) that is selling vehicles may have already created 3-D renderings for the vehicles. In this case, the vehicle search platform may provide receive the vehicle rendering data for the vehicles. For example, the vehicle search platform may provide a request to a data storage device that stores the vehicle rendering data, which may cause the data storage device to provide the vehicle search platform with the vehicle rendering data. As another example, an agreement may have been reached between the entity and an organization associated with the vehicle search platform, which may cause the data storage device to provide the vehicle rendering data to the vehicle search platform.

Additionally, or alternatively, the entity that is using the vehicle search application to market vehicles may not have previously created 3-D renderings of vehicles. In this case, an agent of the organization associated with the vehicle search platform may visit the dealership and may use a 3-D camera of a user device to take images of the inside and/or the outside of the vehicles. In some cases, the user device may be configured with 3-D rendering generation technology and may generate and provide the vehicle search platform with the vehicle rendering data that depicts the 3-D renderings of the vehicles. In other cases, the user device may provide the vehicle search platform with a set of images of the vehicles and the vehicle search platform may process the set of images to generate the vehicle rendering data.

In some implementations, the vehicle search platform may generate vehicle rendering data based on one or more configurable components of a vehicle. For example, the vehicle search platform may receive vehicle characteristics data that indicates a maximum range at which one or more seats within the vehicle may be adjusted (e.g., a seat may have a first seat placement associated with a minimum seat extension distance and a second seat placement associated with a maximum seat extension distance). In this case, the vehicle search platform may generate 3-D renderings of the vehicle that depict the one or more seats at various seat placements, such that a user may be able to view particular 3-D renderings of the vehicle that depict the one or more seats at various placements. It is to be understood that this is provided by example, and that in practice, the vehicle search platform may generate 3-D renderings of vehicles for other types of adjustable components of vehicles.

In some implementations, the 3-D renderings of the collection of vehicles may map to a 3-D coordinate space. For example, a 3-D rendering of a vehicle may include a set of 3-D points, whereby each point has an X coordinate, a Y coordinate, and a Z coordinate. In some implementations, the set of vehicle characteristics for the collection of vehicles may correspond to particular points in the 3-D coordinate space. For example, if a vehicle feature is a sunroof, a vehicle feature identifier for the sunroof may be stored in association with a set of points that define an area of the sunroof.

In some implementations, the vehicle search platform may integrate a set of 3-D renderings of the vehicles into the search feature of the vehicle search application. For example, the vehicle search application may include an interface that displays a list of vehicles that are for sale. In this case, the vehicle search platform may integrate the 3-D renderings of the collection of the vehicles into the application such that the users may be able to view the 3-D renderings via the interface. In some implementations, the 3-D renderings may be available to the users as a plugin of the vehicle search application.

In this way, the vehicle search platform integrates the 3-D renderings of the collection of vehicles into the vehicle search application.

Figure 1B:
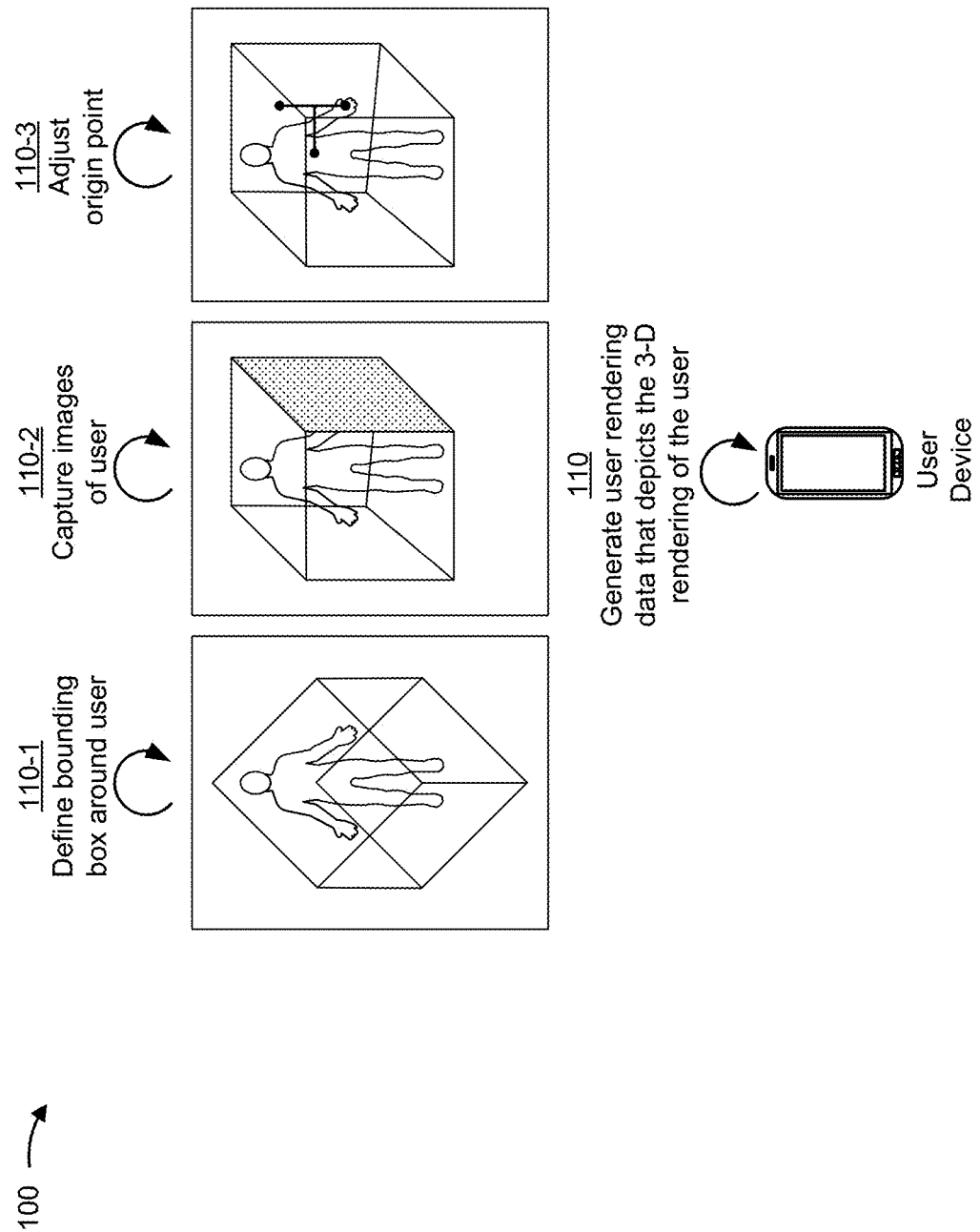

As shown in FIG. 1B, and by reference number 110, a user may use the user device to generate user rendering data that depicts a 3-D rendering of a user. The 3-D rendering of the user may be placed inside of 3-D renderings of vehicles that the user is considering purchasing.

In some implementations, the user may use the user device to access a model generation tool that may be used to generate the 3-D rendering of the user. The model generation tool may be an application hosted on and/or supported by the user device. In some implementations, the user may log into a profile (e.g., by inputting credential information) to access functionality of the model generation tool.

In some implementations, the model generation tool may be part of the vehicle search application. In some implementations, the model generation tool may be separate from the vehicle search application and may be used in conjunction with the vehicle search application. For example, the model generation tool may be used to generate the 3-D rendering of the user and may provide the user rendering data that depicts the 3-D rendering of the user to the vehicle search platform. In this case, the vehicle search platform may integrate the user rendering data into the vehicle search application, may use the user rendering data to support the vehicle search application, and/or the like.

In some implementations, to ensure that the user device captures images that will be sufficient for generating an accurate 3-D rendering of the user, the model generation tool may display a set of instructions that explain how to capture the images. For example, the application may display a set of instructions that include an instruction recommending that another individual capture the images of the user (e.g., to improve the quality of the images that are captured), an instruction indicating which angles to use when capturing the images, an instruction indicating how much of the user has to be captured by the images, an instruction indicating to the user to include a reference point in the images (e.g., a ground, a wall, a vehicle, and/or the like), an instruction indicating a recommended number of images to capture, and/or the like.

Before generating the user rendering data that depicts the 3-D rendering of user, as shown by reference number 110-1, the user device may first define a 3-D bounding box around an image of the user. For example, the individual who is assisting the user in creating the 3-D rendering (referred to herein as a second user) may take the user device (e.g., which has launched the model generation tool) and may position a camera of the user device in a manner that faces the user. This may cause the user device (e.g., using the model generation tool) to project a 3-D bounding box around the user (which, in some cases, may be visible via a display on the user device). This may allow the second user to adjust one or more boundaries of the 3-D bounding box until the 3-D bounding box includes just the user (e.g., and not one or more other objects that may be in the real-world environment around the user).

As shown by reference number 110-2, the user device may capture a set of images of the user. For example, the second user may select a scan button on an interface of the model generation tool which may cause the user device to capture one or more images of the user. In some implementations, the second user may begin walking around the user and using the user device to capture images of the user from different positions, different angles, and/or the like. In some implementations, the model generation tool may record a video of the user (e.g., instead of capturing images of the user).

As shown by reference number 110-3, the user device may adjust an origin point of the 3-D rendering of the user. For example, the user device may process an image of the user and may identify a point of origin based on one or more configured rules (e.g., a configured rule may be used to identify a particular part of the user, such as a hand, a foot, an eye, and/or the like). The origin point may map to a particular 3-D point in a 3-D coordinate space (e.g., a particular X coordinate, Y coordinate, and Y coordinate). In some implementations, the user device may, as part an AR scene that has been generated, present the 3-D rendering of the user on the interface of the user device. This may allow the second user to modify the point of origin by adjusting particular coordinates associated with the origin point.

In some implementations, the user device may generate the 3-D rendering of the user based on the set of images. For example, the second user may interact with the interface of the model generation tool to indicate that an image capturing phase of the process has been completed. This may cause the user device to generate the 3-D rendering of the user based on the set of images. In this case, the 3-D rendering of the user may map to a 3-D coordinate space (e.g., such that a 3-D point on the 3-D rendering has an X coordinate, a Y coordinate, and a Z coordinate). In some implementations, the user device may automatically detect that a sufficient quantity of images have been captured and may generate the user rendering data for the 3-D rendering of the user. In some implementations, the user device may cause an interface of the model generation tool to update in order to notify the second user that a sufficient quantity of images have been captured.

In some implementations, the user device may generate one or more 3-D renderings of the one or more other users (e.g., the second user, a family member of the user, and/or the like). Additionally, or alternatively, the user device may generate one or more 3-D renderings of one or more in-vehicle objects. For example, the user device may generate a 3-D rendering of a car seat for a child, may generate a 3-D rendering of a glass or cup (e.g., which may be placed into a cup holder of a vehicle), may generate a 3-D rendering of a suitcase (e.g., which may be placed into a trunk of a vehicle), and/or the like. In this way, 3-D renderings may be generated for the user, for one or more other users, and/or for one or more in-vehicle objects that may be placed within 3-D renderings of vehicles to assist the user in making vehicle purchasing decisions, as described further herein.

While one or more implementations described herein describe the user device as generating one or more 3-D renderings, it is to be understood that this is provided by way of example. In other implementations, for example, the user device may capture the set of images of the user, may provide the set of images to the vehicle search platform, and the vehicle search platform may generate the 3-D rendering of the user.

In this way, the vehicle search platform generates one or more 3-D renderings (e.g., of the user, of the one or more other others, of the one or more in-vehicle objects, and/or the like) that may assist the user in making vehicle purchasing decisions, as further described below.

Figure 1C:
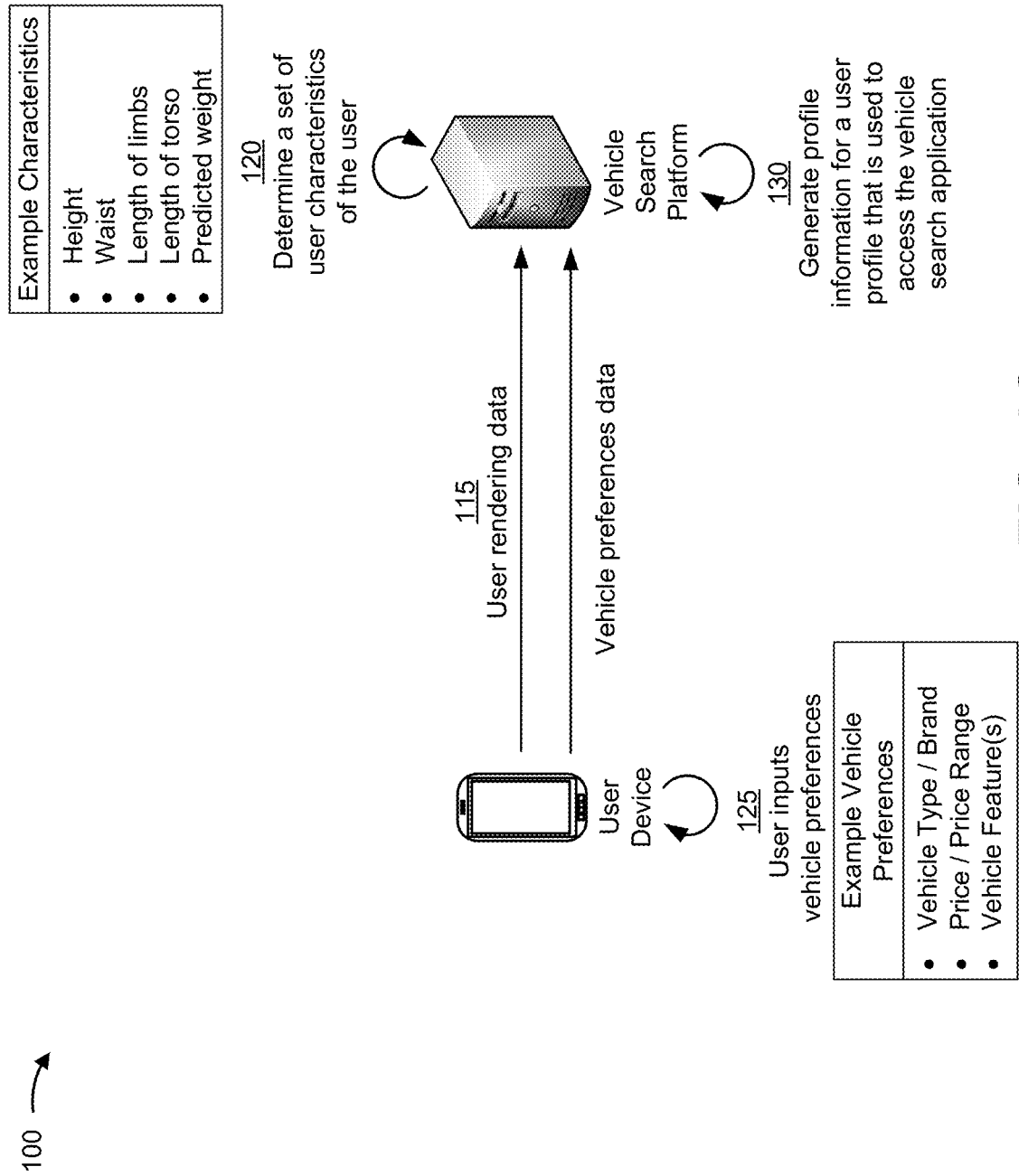

As shown in FIG. 1C, and by reference number 115, the user rendering data that depicts the 3-D rendering of the user may be provided to the vehicle search platform. For example, the user may interact with the interface of the model generation tool and/or an interface of the vehicle search application to provide the user rendering data to the vehicle search platform. In this case, the user device may use an application programming interface (API) or another type of communication interface to provide the user rendering data to the vehicle search platform.

Additionally, or alternatively, particular user rendering data that depicts the one or more 3-D renderings of the one or more other users may be provided to the vehicle search platform. Additionally, or alternatively, in-vehicle object data that depicts the one or more 3-D renderings of the one or more in-vehicle objects may be provided to the vehicle search platform.

As shown by reference number 120, the vehicle search platform may determine a set of user characteristics of the user. For example, the vehicle search platform may process the user rendering data using a set of image processing techniques to determine a set of user characteristics of the user.

The set of image processing techniques may include one or more computer vision techniques, one or more object recognition techniques, one or more characteristic recognition techniques, a technique using a gait analysis, one or more machine learning techniques, and/or the like. The set of user characteristics may include a height of the user, a width of one or more body parts of the user (e.g., a leg of the user, a shin of the user, a knee of the user, and/or the like), a length of the one or more body parts of the user (e.g., the leg of the user, the shin of the user, the knee of the user, and/or the like), a measurement of the user's waist, a measurement of the user's shoulder and/or hip portions, an estimated weight of the user, and/or any other characteristics that may be used to define dimensions of the user (e.g., which may impact how the user fits within particular vehicles).

As an example, the vehicle search platform may determine a height of the user. For example, the user rendering data for the 3-D rendering of the user may include a set of 3-D points that are part of a 3-D coordinate space. In this example, the vehicle search platform may identify a height of the user by performing a height recognition technique to identify a first 3-D point on the user that makes contact with a ground plane (e.g., which represents the ground in the real-world environment of the user), where the first 3-D point includes a Y coordinate that is equal to or lower than any other Y coordinate found within other 3-D points on the user. Next, the vehicle search platform may identify a second 3-D point on the user that includes an X coordinate that matches an X coordinate included in the first 3-D point and includes a Y coordinate that is equal to or greater than any other Y coordinate found within other 3-D points on the user. This may allow the vehicle search platform to determine the difference between the Y coordinate in the first 3-D point and the Y coordinate in the second 3-D point and to determine the height of the user based on the difference (e.g., a distance in the 3-D coordinate space may map to a distance in the real-world environment of the user).

As shown by reference number 125, the user may interact with the user device to input a set of vehicle preferences. For example, the user may log into the vehicle search application and may input a set of vehicle preferences that indicate a preferred type of vehicle, a preferred brand of vehicle, a preferred cost or cost range when purchasing a vehicle, a preferred set of vehicle features (e.g., a type of transaction, a type of trim, a color, and/or the like). This may cause the vehicle preference data that identifies the set of vehicle preferences to be provided to the vehicle search platform.

As shown by reference number 130, the vehicle search platform may generate profile information for a user profile that is used to access the vehicle search application. For example, the user may have registered for access to the vehicle search application by creating a user profile. In this case, the vehicle search application may generate, for the user profile, profile information that includes user characteristics data identifying the set of user characteristics of the user, the vehicle preference data identifying the set of vehicle preferences of the user, and/or the like.

In some implementations, the vehicle search platform may use the profile information to customize the search feature of the vehicle search application for the user. For example, the vehicle search feature may include a set of search parameters that allow users to filter through a collection of vehicles (e.g., which may be listed for sale).

The set of search parameters may include a parameter for searching by vehicle type, a parameter for searching by a price range, a parameter for searching by vehicle color, a parameter for searching by mileage, and/or a set of custom search parameters, such as one or more custom search parameters relating to a size of the user (e.g., a search parameter that may be used to filter vehicles based on a height of the user, a search parameter that may be used to filter vehicles based on a width or estimated weight of the user, and/or the like), one or more search parameters relating to vehicle preferences (e.g., a search parameter that may be used to filter vehicles based on a vehicle preference of the user), and/or the like. In this case, the vehicle search platform may be configured with a set of search rules that specify how to filter the collection of vehicles based on particular search parameters.

As a specific example, if the user, while using the search feature of the vehicle search application, selects height as a search parameter, the vehicle search platform may obtain the height of the user (e.g., by referencing the profile information) and may filter the collection of vehicles based on a search rule indicating that certain types of vehicles are to be excluded from search results if the height of the user is above a threshold height (e.g., if an individual is taller than 6 feet, 4 inches (6' 4"), certain types of vehicles that are too small for the individual may be omitted from the search results). Additional information regarding the search filter is provided further herein.

Additionally, or alternatively, the vehicle search platform may generate additional user characteristics data for the one or more other users (e.g., in a manner described above) and/or may update the user profile and/or other user profiles based on the additional user characteristics data. Additionally, or alternatively, the vehicle search platform may generate object characteristics data for the one or more in-vehicle objects (e.g., in the manner described above) and/or may update the user profile and/or the other profiles based on the object characteristics data.

In this way, the vehicle search platform determines user characteristics, object characteristics, and/or vehicle preferences that may be used to assist the user in making vehicle purchasing decisions.

Figure 1D:
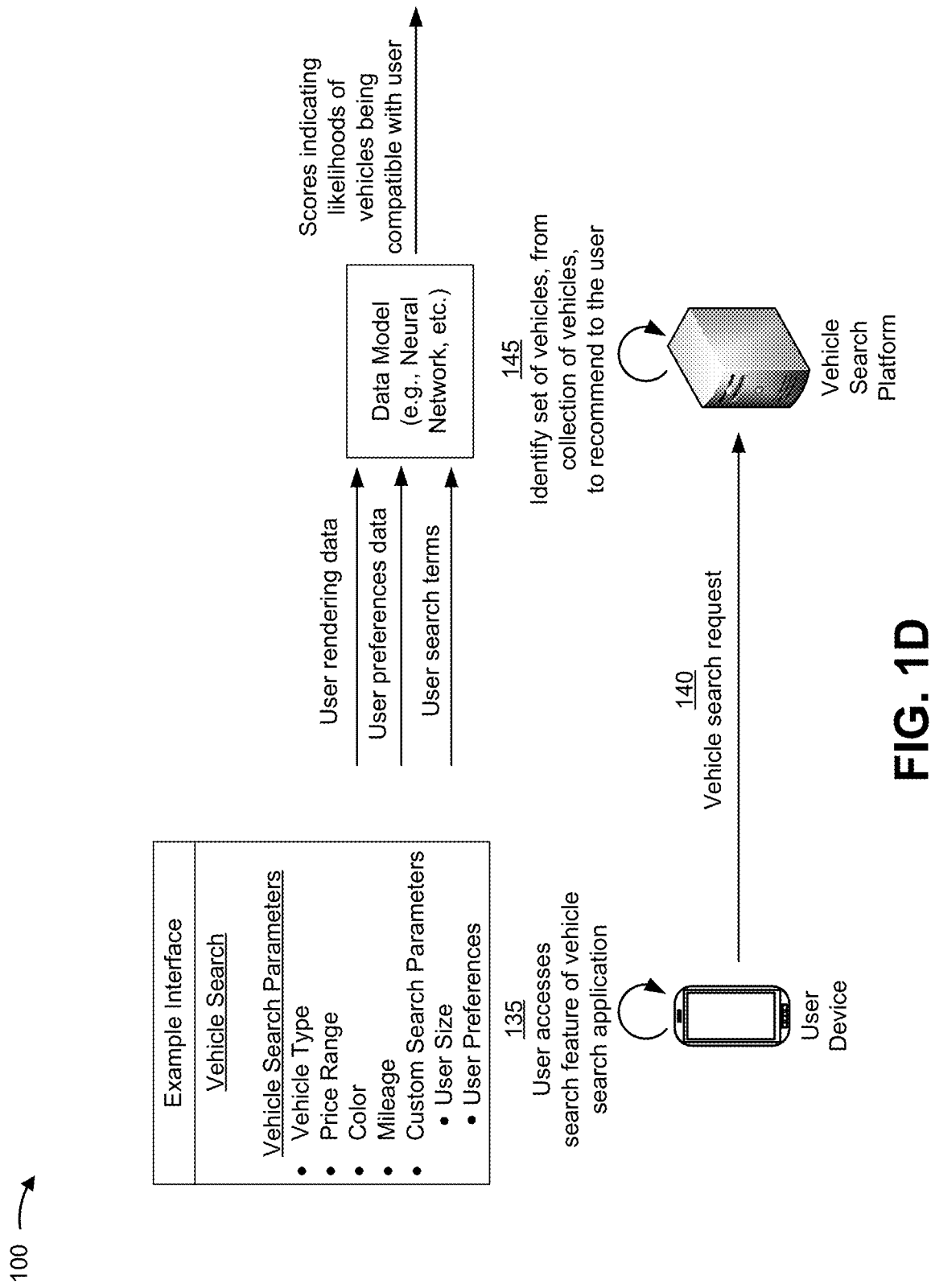

As shown in FIG. 1D, and by reference number 135, the user may access a search feature of the vehicle search application. For example, the user may access an interface of the vehicle search application (e.g., a webpage of a website, an interface of a mobile application, and/or the like), which may display the set of search parameters that are available to the user. The user may interact with the search feature to select particular search parameters that are to be included as part of a vehicle search request.

As shown by reference number 140, the vehicle search platform may receive the vehicle search request from the user device. For example, the user may interact with the interface of the search feature to submit the vehicle search request, which may include an identifier of the user, an identifier of the user device, one or more search parameter identifiers corresponding to one or more search parameters that have been selected, and/or the like. This may cause the vehicle search request to be provided to the vehicle search platform (e.g., via an API or another type of communication interface).

As shown by reference number 145, the vehicle search platform may identify a set of vehicles to recommend to the user. For example, the vehicle search platform may have access to a data structure that associates a set of vehicle identifiers for a collection of vehicles that are being offered for sale with corresponding vehicle data for the collection of vehicles (e.g., vehicle description data for the collection of vehicles, vehicle image data for the collection of vehicles, and/or the like). In this case, the vehicle search platform may identify a set of vehicles, from the collection of vehicles, by using a set of search rules to filter the collection of vehicles (e.g., which may be selected based on selected search parameters), by using a data model that has been trained using machine learning to identify vehicles that are predicted to be compatible with the user, and/or the like, as each described below.

In some implementations, the vehicle search platform may identify one or more vehicles to recommend based on one or more search rules. The one or more search rules may correspond to the one or more search parameters that have been selected and may be used to filter the collection of vehicles. The one or more search rules may, for example, include a first search rule indicating that a vehicle is to be excluded from search results if a height of the user satisfies a threshold height (e.g., a threshold height may correspond to a particular type of vehicle and may be based on a distance between a first point on a seat of the vehicle and a second point of a ceiling of the vehicle), a second search rule indicating that a vehicle is to be excluded from the search results if a width of the user satisfies a threshold width (e.g., a threshold width may correspond to a width of a seat found in a particular type of vehicle), a third search rule indicating that a vehicle is to be excluded from search results if the vehicle does not comply with a vehicle preference of the user, a fourth search rule indicating that a vehicle is to be excluded from search results based on feedback provided by the user, and/or the like. Vehicle data for the collection of vehicles may be stored in association with the one or more search rules and/or identifiers for the one or more search rules, which may allow the vehicle search platform to filter the collection of vehicles based on the one or more search rules.

As an example, the vehicle search platform may receive a custom search parameter indicating to filter vehicles based on a height of the user. In this example, the vehicle search platform may obtain data identifying the height of the user (e.g., from the user profile), and may compare the height of the user and a set of threshold heights that correspond to the collection of vehicles. As a specific example, vehicle data for a vehicle may be stored in association with a threshold height of 6' 4", where the threshold height is configured based on an estimation that users that are 6' 4" or taller are unlikely to fit into the vehicle. If, for example, the height of the user satisfies (e.g., is greater than) the threshold height corresponding to the vehicle, the vehicle search platform may exclude the vehicle from the search results.

Additionally, or alternatively, the vehicle search platform may identify one or more vehicles to recommend using the data model. For example, the vehicle search platform may have trained a data model (or received a trained data model) and may use the data model to generate scores that indicate likelihoods of each vehicle, in the collection of vehicles, being compatible with the user. The vehicle search platform may, based on the scores, identify one or more vehicles, of the collection of vehicles, to recommend to the user. Descriptions of training the data model and using the data model are provided below.

In some implementations, the vehicle search platform may have determined a set of training features that may be used to train the data model. For example, the vehicle search platform may perform a set of feature identification techniques to process historical data to identify a set of training features that may be used to train the data model. The set of feature identification techniques may include using a technique that involves text mining and latent semantic analysis (LSA), a trend variable analysis technique, an interest diversity analysis technique, a technique using a neural network, a composite indicators analysis technique, a clustering technique, a regression technique, and/or the like. The historical data may include historical vehicle data (e.g., historical vehicle description data, historical 3-D renderings of vehicles, and/or the like), historical user data (e.g., historical user purchasing history data, historical user rendering data, historical vehicle preference data, and/or the like), and/or the like.

A training feature may be a value (e.g., a numerical value, a character value, and/or the like) or a group of values (e.g., a term that comprises multiple character values, a combination of terms, a combination of a numerical value, a character value, and/or a term, and/or the like) that increases a likelihood of a user being compatible with a vehicle and/or that decreases a likelihood of a user being compatible with a vehicle. The set of training features may include one or more user characteristics (e.g., a characteristic indicating a height of the user, a characteristic indicating a width of a user, and/or the like), one or more user preferences, one or more vehicle characteristics of particular vehicles, one or more trends (e.g., a trend that indicates that users that share a particular type of demographic information are more likely to be compatible with particular types of vehicles), combinations of one or more other training features described above, and/or the like.

In some implementations, the vehicle search platform may perform a feature identification technique to determine the set of training features. For example, the vehicle search platform may perform a trend variable analysis technique to identify training features associated with changes to data over a given time period. In this case, the vehicle search platform may aggregate values periodically and may compare the aggregated values to identify changes over a given time period. This may allow the vehicle search platform to identify trends or patterns that may be used as training features. To provide a few examples, the vehicle search platform may determine that an individual is 30% more likely to be compatible with a vehicle if a height of the user falls within a threshold range of heights, 80% more likely to be compatible with a vehicle if vehicle characteristics of the vehicle satisfy all of the vehicle preferences of the user, and/or the like.

In some implementations, the vehicle search platform may train the data model based on the set of training features. For example, the vehicle search platform may process the set of features using one or more machine learning techniques to generate a data model that is able to generate scores that indicate likelihoods of particular input data values (e.g., particular features) increasing or decreasing likelihoods of particular vehicles being compatible with particular users. The one or more machine learning techniques may include a classification-based technique, a regression-based technique, a clustering-based technique, a technique using a neural network, and/or the like.

As an example, the vehicle search platform may train a neural network based on the set of training features. In this example, the vehicle search platform may train a neural network that has an input layer, one or more intermediate layers (e.g., a fully connected layer, a convolutional layer, a pooling layer, a recurrent layer, and/or the like), and an output layer. Additionally, the set of features may be hyperparameters that are used as part of a cost function of the neural network. In this case, the vehicle search platform may perform a feedforward technique to provide particular historical data values (e.g., that are part of a test dataset) as input to the neural network, and the neural network may output scores that indicate likelihoods of each vehicle, of the collection of vehicles, being compatible with a particular user.

Additionally, the vehicle search platform may compare scores to known values and may determine an error value based on the comparison between the scores and the known values. The error value may be used to update the cost function (e.g., which may assign weights to particular features of the set of features), and the vehicle search platform may perform a back-propagation technique to iteratively train the neural network until a threshold level of accuracy has been reached.

To use the data model that has been trained, the vehicle search platform may determine a set of features (e.g., a subset of the set of training features) based on the user rendering data and/or the vehicle preference data provided by the user device. For example, the vehicle search platform may use one or more feature identification techniques (as described above) to determine a set of features that are based on data provided by the user device. In this case, the vehicle search platform may provide, as input to the data model, the set of features to cause the data model to output a set of scores that indicate likelihoods of each vehicle, of the collection of vehicles, being compatible with the user. Furthermore, the vehicle search platform may identify the set of vehicles based on the set of scores. For example, the vehicle search platform may be configured with a threshold confidence score, and may identify the set of vehicles, from the collection of vehicles, based on the set of vehicles corresponding to scores that satisfy the threshold confidence score.

In some implementations, the vehicle search platform may identify the set of vehicles using the one or more search rules and the data model. For example, the vehicle search platform may use the one or more search rules to filter the collection of vehicles to identify a subset of the collection of vehicles. In this case, the vehicle search platform may determine the set of features and may provide the set of features as input to the data model to cause the data model to output a set of scores that indicate likelihoods of each vehicle, of the subset of the collection of vehicles, being compatible with the user. This may allow the vehicle search platform to identify one or more vehicles to recommend to the user based on the set of scores. By filtering the collection of vehicles based on the one or more search rules before using the data model, the vehicle search platform reduces a utilization of resources (e.g., processing resources, network resources, and/or the like) relative to using the data model to process vehicle data for the entire collection of vehicles.

In this way, the vehicle search platform identifies the set of vehicles to recommend to the user.

Figure 1E:
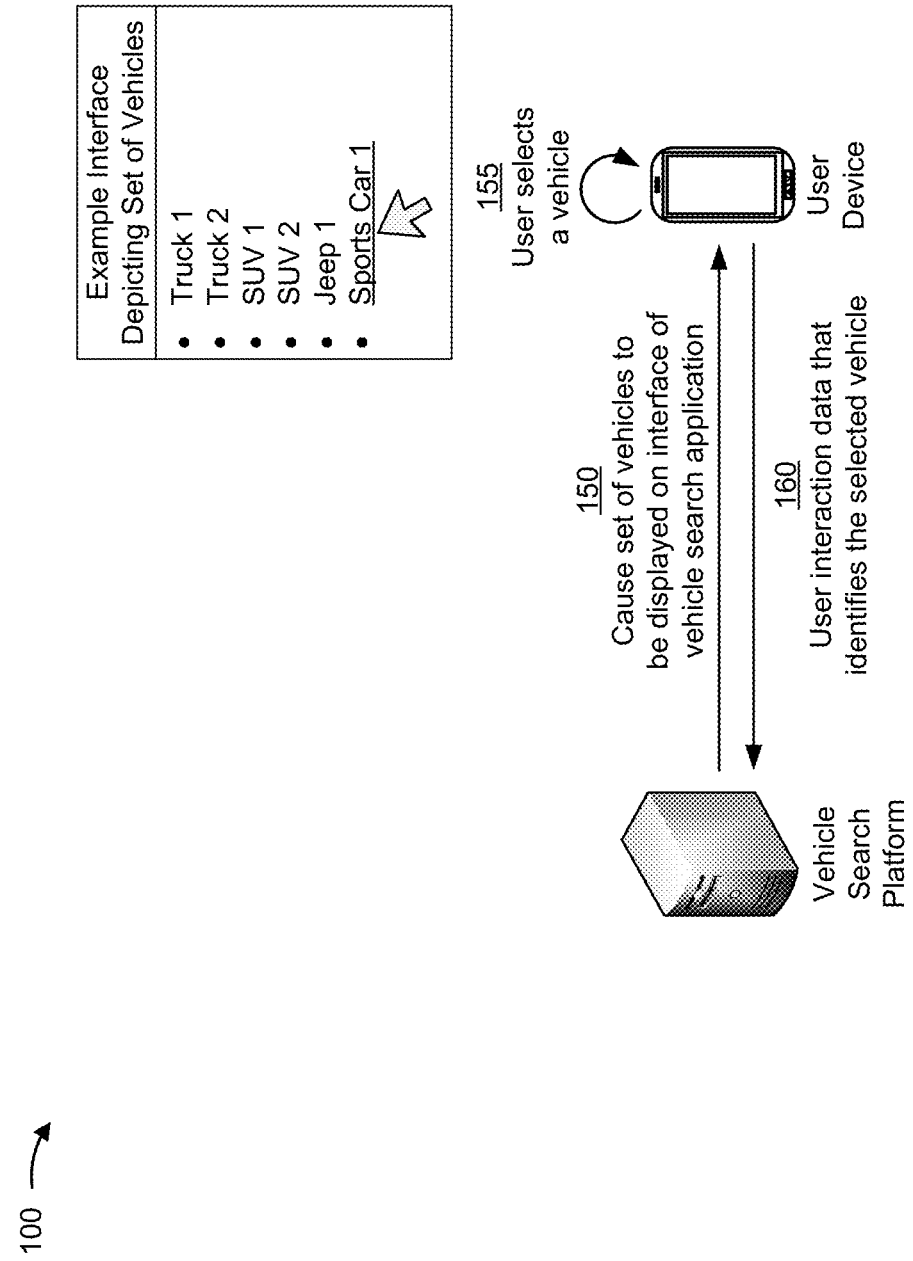

As shown in FIG. 1E, and by reference number 150, the vehicle search platform may cause the set of vehicles to be displayed on an interface of the user device. For example, if the vehicle search application is not hosted on the vehicle search platform (e.g., the application may be hosted on another device that is external to the vehicle search platform), then the vehicle search platform may provide vehicle identifiers for the set of vehicles to the other device. This may allow the other device to update the interface of the vehicle search application to display vehicle data for the set of vehicles. The vehicle data that is displayed may include a list of vehicle identifiers for the set of vehicles, features of vehicles, images of the vehicles (e.g., 2-D images and/or 3-D images), and/or the like.

In other cases, the vehicle search application may be hosted on the vehicle search platform. In these cases, the vehicle search platform may use the vehicle identifiers for the vehicle identifiers to identify the vehicle data that is to be displayed, and to update the interface of the vehicle search application to display the vehicle data.

As shown by reference number 155, the user may interact with the interface of the vehicle search application to select a vehicle. In some implementations, the user may interact with the interface of the vehicle search application to select multiple vehicles, to select particular vehicle characteristics of vehicles, and/or the like. In some implementations, the vehicle search platform may automatically select one or more vehicles and/or vehicle characteristics (e.g., without the user needing to interact with the interface). For example, the vehicle search platform may automatically select one or more vehicles based on the scores that indicate likelihoods of particular vehicles being compatible with the user (e.g., as output by the data model), confidence values corresponding to the scores, one or more configurable rules that specify when the vehicle search platform may automatically select a vehicle and/or a vehicle characteristic, and/or the like.

In the example shown, the interface may display the set of vehicles that are being recommended (shown as Truck 1, Truck 2, Sports Utility Vehicle (SUV) 1, SUV 2, Jeep 1, and Sports Car 1), and the user may interact with the interface to select a vehicle (shown as Sports Car 1). When the vehicle is selected, and as shown by reference number 160, user interactions data that includes a vehicle identifier for the selected vehicle may be provided to the vehicle search platform.

In this way, the user selects a vehicle from the set of vehicles that has been recommended by the vehicle search platform.

Figure 1F:
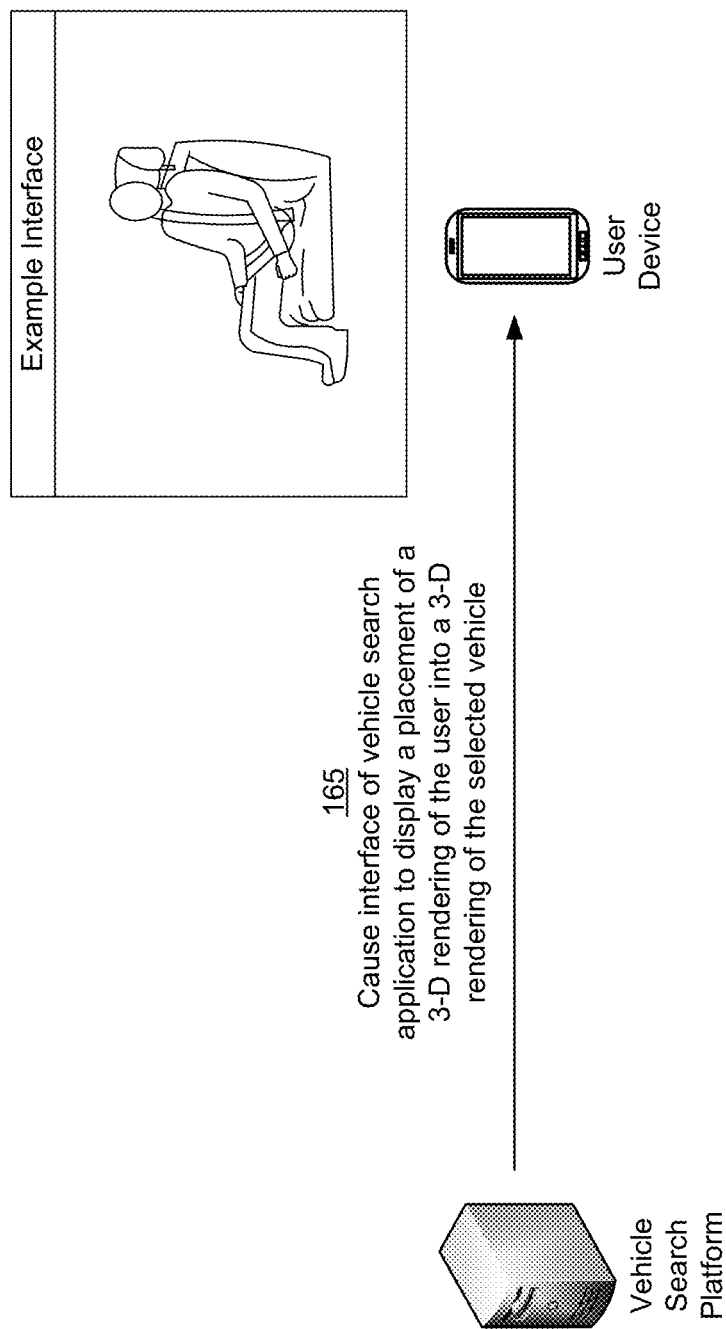

As shown in FIG. 1F, and by reference number 165, the vehicle search platform may cause an interface of the vehicle search application to display a placement of the 3-D rendering of the user into a 3-D rendering of the selected vehicle. For example, the vehicle search platform may use an identifier of the user to obtain the 3-D rendering of the user (e.g., which may be stored as part of, or in association with, the profile information for the user). Additionally, the vehicle search platform may use the vehicle identifier for the selected vehicle to identify the 3-D rendering of the vehicle. In this case, the vehicle search platform may cause the interface of the vehicle search application to display a placement of the 3-D rendering of the user into the 3-D rendering of the selected vehicle. Additionally, the vehicle search platform may be configured with instructions that define a reference point at which to place the 3-D rendering of the user into 3-D rendering of the vehicle, as further described below.

In the example shown, the vehicle search platform may cause the 3-D rendering of the user to be placed in a seat of the vehicle. In this example, the vehicle search platform may be configured with a reference point of a seat of a 3D rendering of a vehicle, may identify the reference point within the 3-D rendering of the vehicle, and may place the 3-D rendering of the user into the 3-D rendering of the vehicle, such that the 3-D rendering of the user is placed relative to the reference point of the seat. This may allow the 3-D rendering of the user to depict the user sitting in the seat, which may illustrate to the user a degree to which the user fits in the seat.

In some implementations, the user may interact with an AR scene to select where to place the 3-D rendering of the user. For example, the vehicle search platform may launch an AR scene that may be displayed on the interface of the vehicle search application, such that the interface displays the 3-D rendering of the vehicle. In this case, the user may interact with the interface (e.g., by selecting and/or pointing to a location on the 3-D rendering of the vehicle), such as by interacting with a 3-D representation of a seat of the vehicle, a door of the vehicle, and/or the like. This may cause the vehicle search platform to place the 3-D rendering of the user based on the selected location. For example, the vehicle search platform may place the 3-D rendering of the user such that the 3-D rendering of the user is sitting within a selected seat of the vehicle, may place the 3-D rendering of the user such that the 3-D rendering of the user is opening a door of the vehicle, and/or the like.

In some implementations, the user may control a position of the 3-D rendering of the user within the AR scene. For example, if the 3-D rendering of the user has been placed in a seat of a vehicle, the user may be able to move the hands of the 3-D rendering of the user to grab the steering wheel, may be able to move the feet of the 3-D rendering of the user onto a brake pedal and/or a gas pedal of the vehicle, and/or the like (e.g., which may allow the user to determine whether the user fits in the seat, whether the seat needs to be adjusted, and/or the like).

In some implementations, the user may interact with one or more configurable settings of the 3-D rendering of the vehicle. For example, the user may interact with the interface to adjust a seat placement of a seat of the vehicle. Additionally, the user may select and/or point to a seat adjustment control button and may select a particular seat placement. In this case, the vehicle search platform may cause the interface depicting the AR scene to display a sequence of 3-D renderings of the vehicle, such that the seat of the vehicle updates on the interface from an initial seat placement to the particular seat placement selected by the user.

In some implementations, the vehicle search platform may place 3-D renderings of multiple users into the 3-D rendering of the vehicle. For example, the user may have created a 3-D rendering of the user and one or more additional 3-D renderings of one or more other family members. In this case, the vehicle search platform may cause the interface of the vehicle search application to display the 3-D rendering of the user and/or the one or more additional 3-D renderings of the one or more other family members. In some cases, the user may select a 3-D rendering of a particular user to place into the 3-D rendering of the vehicle (e.g., by interacting with the interface), may select a location within the vehicle at which to place the 3-D rendering of the particular user, and/or the like.

In some implementations, the vehicle search platform may place 3-D renderings of in-vehicle objects into the 3-D rendering of the vehicle. For example, the user may have created a 3-D rendering of a car seat for a child, of a glass or cup that may be placed into a cup holder, of a suitcase that may be placed into a trunk, and/or the like. In this case, the vehicle search platform may cause the interface to display the 3-D renderings of the in-vehicle objects within the 3-D rendering of the vehicle. In some cases, the user may select a 3-D rendering of a particular in-vehicle object to place into the 3-D rendering of the vehicle, may select a location within the vehicle at which to place the 3-D rendering of the particular in-vehicle object, and/or the like.

In some implementations, the vehicle search platform may place the 3-D rendering of the user and/or 3-D renderings of in-vehicle objects into 3-D renderings of multiple vehicles. For example, if the user and/or the vehicle search platform selected multiple vehicles, the vehicle search platform may place the 3-D rendering of the user and/or the 3-D renderings of the in-vehicle objects into 3-D renderings of multiple vehicles. This may cause the interface to concurrently display images depicting the user sitting within each of the multiple vehicles, display images depicting the in-vehicle objects within each of the multiple vehicles, and/or the like. This may allow the user to view how the user fits in multiple vehicles at the same time, thereby allowing the user make a comparison regarding how the user fits in each respective vehicle relative to the other vehicles.

In this way, the vehicle search platform uses AR to identify optimal vehicles to recommend to the user and, when the user selects a vehicle, provides the user with one or more illustrations that indicate a degree to which the user, one or more other users, and/or one or more in-vehicle objects may be compatible with the vehicle.

As indicated above, FIGS. 1A-1F are provided merely as one or more examples. Other examples may differ from what is described with regard to FIGS. 1A-1F. For example, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple and/or distributed devices. Additionally, or alternatively, a set of devices (e.g., one or more devices) included in the one or more example implementations 100 may perform one or more functions described as being performed by another set of devices included in the one or more example implementations 100.

Figure 2:
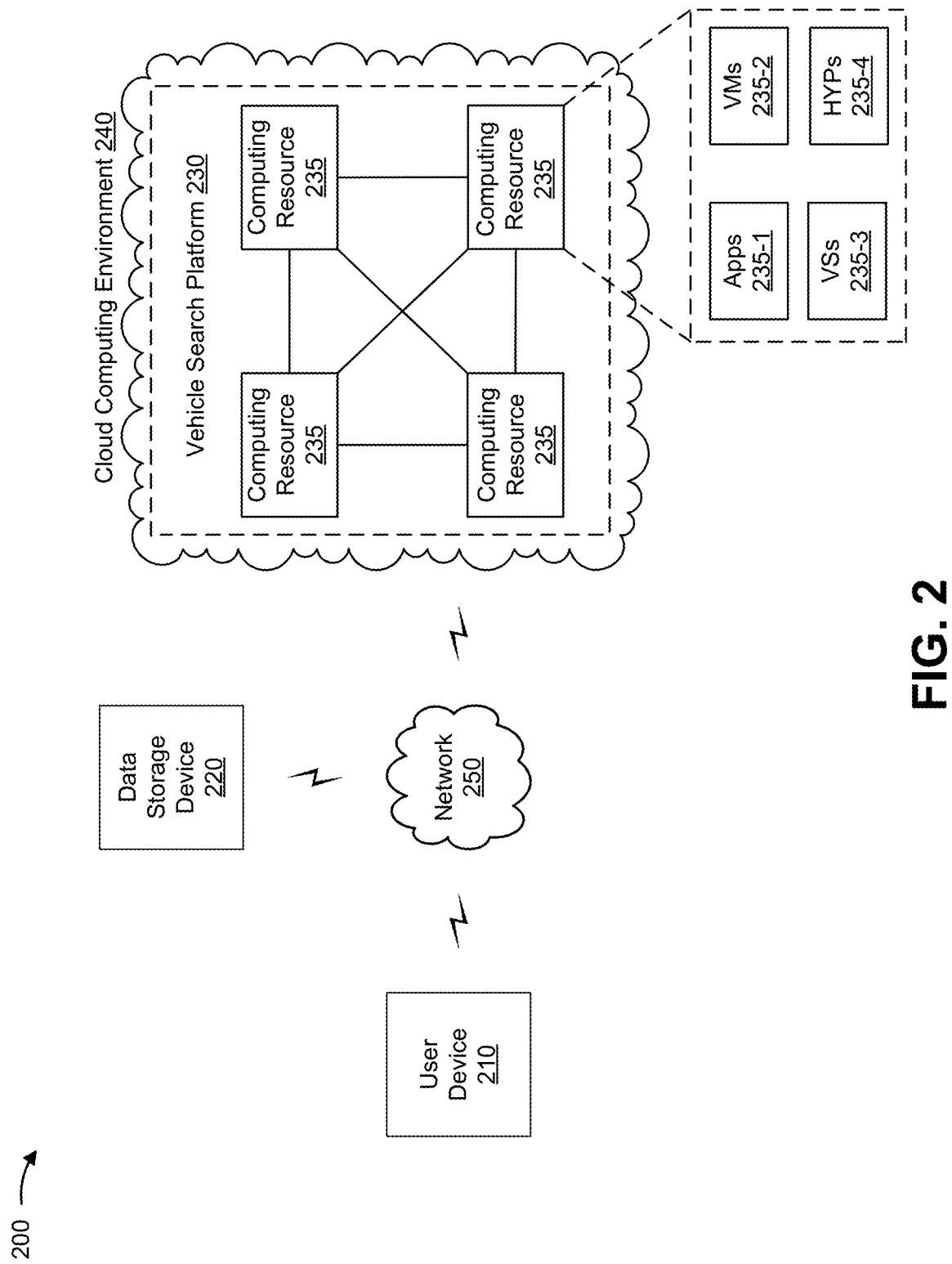
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a data storage device 220, a vehicle search platform 230 supported within a cloud computing environment 240, and a network 250. Devices of environment 200 may interconnect via wired connections, wireless connections, or a combination of wired and wireless connections.

User device 210 includes one or more devices capable of receiving, generating, storing, processing, and/or providing information associated with a vehicle search application. For example, user device 210 may include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, smart clothing, and/or the like), or a similar type of device. In some implementations, user device 210 may include a display, an image capture component (e.g., a sensor, a camera, a camcorder, and/or the like), a location tracking component (e.g., a global positioning system (GPS), an accelerometer, and/or the like), and/or the like. In some implementations, user device 210 may host, support, and/or have access to a vehicle search application. In some implementations, user device 210 may host an augmented reality (AR) scene. In some implementations, user device 210 may host, support, and/or have access to a model generation tool. In some implementations, user device 210 may perform one or more functions described herein as being performed by vehicle search platform 230. For example, user device 210 may process user rendering data for a 3-D rendering of a user to determine a set of user characteristics of the user.

Data storage device 220 includes one or more devices capable of receiving, storing, generating, determining, and/or providing data associated with a vehicle search application. For example, data storage device 220 may include a server device or a group of server devices. In some implementations, one or more data storage devices 220 may store vehicle rendering data that depicts three-dimensional (3-D) renderings of vehicles, vehicle description data that describes the vehicles, user rendering data that depicts 3-D renderings of users, vehicle preferences data that describes vehicle preferences of users, and/or the like.

Vehicle search platform 230 includes one or more devices capable of receiving, storing, generating, determining, and/or providing information associated with a vehicle search application. For example, vehicle search platform 230 may include a server device (e.g., a host server, a web server, an application server, etc.), a data center device, or a similar device. In some implementations, vehicle search platform 230 may host and/or support a vehicle search application, according to one or more implementations described herein.

In some implementations, as shown, vehicle search platform 230 may be hosted in cloud computing environment 240. While implementations described herein describe vehicle search platform 230 as being hosted in cloud computing environment 240, in some implementations, vehicle search platform 230 may be non-cloud-based (i.e., may be implemented outside of a cloud computing environment) or may be partially cloud-based.

Cloud computing environment 240 includes an environment that hosts vehicle search platform 230. Cloud computing environment 240 may provide computation, software, data access, storage, etc. services that do not require end-user knowledge of a physical location and configuration of system(s) and/or device(s) that hosts vehicle search platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host vehicle search platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210 and/or data storage device 220. Application 235-1 may eliminate a need to install and execute the software applications on these devices. For example, application 235-1 may include software associated with vehicle search platform 230 and/or any other software capable of being provided via cloud computing environment 240. In some implementations, one application 235-1 may send/receive information to/from one or more other applications 235-1, via virtual machine 235-2. In some implementations, application 235-1 may include the vehicle search application. Additionally, or alternatively, application 235-1 may include the model generation tool.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210, data storage device 220, and/or the like), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
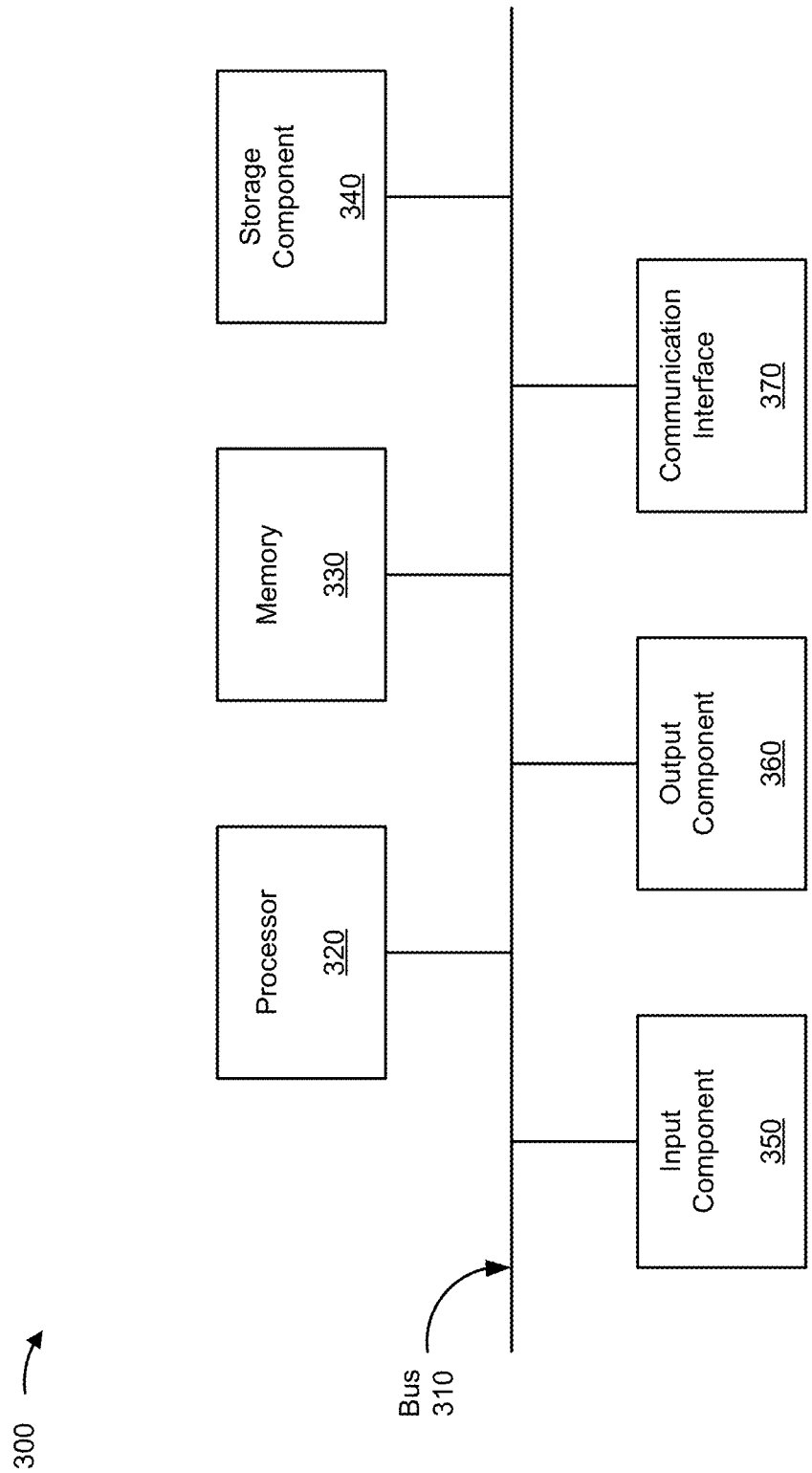
FIG. 3 is a diagram of example components of one or more devices of FIG. 2.

FIG. 3 is a diagram of example components of a device 300. Device 300 may correspond to user device 210, data storage device 220, and/or vehicle search platform 230. In some implementations, user device 210, data storage device 220, and/or vehicle search platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
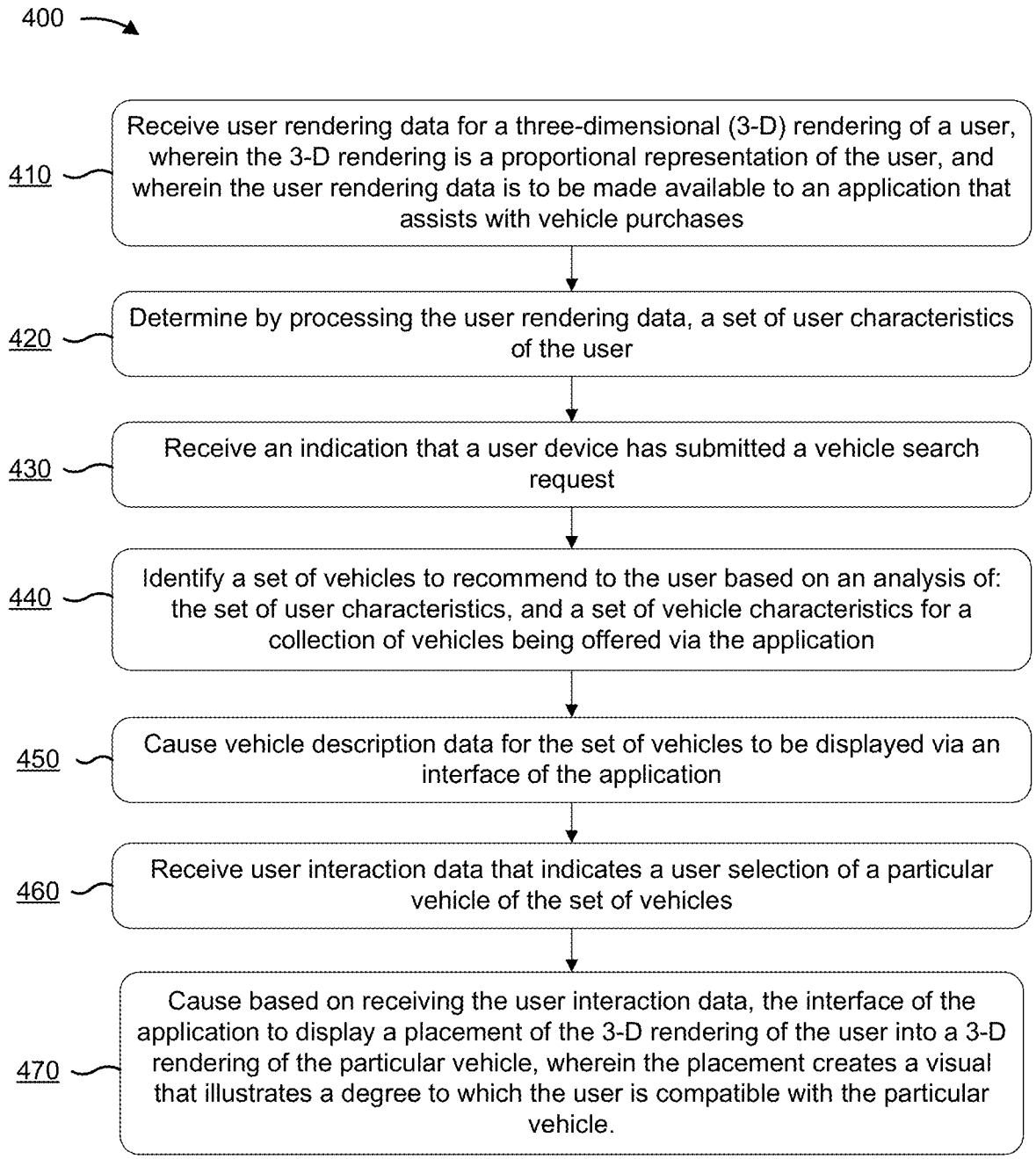
FIGS. 4-6 are flowcharts of one or more example processes for using augmented reality (AR) to assist a user in searching for a vehicle.

FIG. 4 is a flow chart of an example process 400 for using augmented reality (AR) to assist a user in searching for a vehicle. In some implementations, one or more process blocks of FIG. 4 may be performed by a vehicle search platform (e.g., vehicle search platform 230). In some implementations, one or more process blocks of FIG. 4 may be performed by another device or a group of devices separate from or including the vehicle search platform, such as a user device (e.g., user device 210), a data storage device (e.g., data storage device 220), and/or the like.

As shown in FIG. 4, process 400 may include receiving user rendering data for a three-dimensional (3-D) rendering of a user, wherein the 3-D rendering is a proportional representation of the user, and wherein the user rendering data is to be made available to an application that assists with vehicle purchases (block 410). For example, the vehicle search platform (e.g., using computing resource 235, processor 320, memory 330, storage component 340, input component 350, communication interface 370, and/or the like) may receive user rendering data for a three-dimensional (3-D) rendering of a user, as described above. In some implementations, the 3-D rendering may be a proportional representation of the user. In some implementations, the user rendering data may be made available to an application that assists with vehicle purchases.

As further shown in FIG. 4, process 400 may include determining, by processing the user rendering data, a set of user characteristics of the user (block 420). For example, the vehicle search platform (e.g., using computing resource 235, processor 320, memory 330, storage component 340, and/or the like) may determine, by processing the user rendering data, a set of user characteristics of the user, as described above.

As further shown in FIG. 4, process 400 may include receiving an indication that a user device has submitted a vehicle search request (block 430). For example, the vehicle search platform (e.g., using computing resource 235, processor 320, memory 330, storage component 340, input component 350, communication interface 370, and/or the like) may receive an indication that the user device (e.g., user device 210) has submitted a vehicle search request, as described above.

As further shown in FIG. 4, process 400 may include identifying a set of vehicles to recommend to the user based on an analysis of: the set of user characteristics, and a set of vehicle characteristics for a collection of vehicles being offered via the application (block 440). For example, the vehicle search platform (e.g., using computing resource 235, processor 320, memory 330, storage component 340, and/or the like) may identify a set of vehicles to recommend to the user based on an analysis of: the set of user characteristics, and a set of vehicle characteristics for a collection of vehicles being offered via the application, as described above.

As further shown in FIG. 4, process 400 may include causing vehicle description data for the set of vehicles to be displayed via an interface of the application (block 450). For example, the vehicle search platform (e.g., using computing resource 235, processor 320, memory 330, storage component 340, input component 350, output component 360, communication interface 370, and/or the like) may cause vehicle description data for the set of vehicles to be displayed via an interface of the application, as described above.

As further shown in FIG. 4, process 400 may include receiving user interaction data that indicates a user selection of a particular vehicle of the set of vehicles (block 460). For example, the vehicle search platform (e.g., using computing resource 235, processor 320, memory 330, storage component 340, input component 350, communication interface 370, and/or the like) may receive user interaction data that indicates a user selection of a particular vehicle of the set of vehicles, as described above.

As further shown in FIG. 4, process 400 may include causing, based on receiving the user interaction data, the interface of the application to display a placement of the 3-D rendering of the user into a 3-D rendering of the particular vehicle, wherein the placement creates a visual that illustrates a degree to which the user is compatible with the particular vehicle (block 470). For example, the vehicle search platform (e.g., using computing resource 235, processor 320, memory 330, storage component 340, input component 350, output component 360, communication interface 370, and/or the like) may cause, based on receiving the user interaction data, the interface of the application to display a placement of the 3-D rendering of the user into a 3-D rendering of the particular vehicle, as described above. In some implementations, the placement may create a visual that illustrates a degree to which the user is compatible with the particular vehicle.

Process 400 may include additional implementations, such as any single implementation or any combination of implementations described below and/or in connection with one or more other processes described elsewhere herein.

In a first implementation, the visual illustrates the 3-D rendering of the user sitting on a seat within the 3-D rendering of the particular vehicle.

In a second implementation, alone or in combination with the first implementation, the vehicle search platform may, before receiving the indication that the user device has submitted the vehicle search request, integrate the set of user characteristics into a search feature of the application to permit the search feature to offer search parameters that are customized to the user.

In a third implementation, alone or in combination with one or more of the first and second implementations, the vehicle search platform may, when identifying the set of vehicles to recommend, analyze the set of user characteristics and the set of vehicle characteristics using a data model that has been trained using one or more machine learning techniques, and may identify the set of vehicles based on the set of scores.

In a fourth implementation, alone or in combination with one or more of the first through third implementations, the vehicle search platform may, when causing the vehicle description data for the set of vehicles to be displayed via the interface, cause the interface to display, as part of the vehicle description data, the set of scores that indicate the likelihoods of one or more of the collection of vehicles being compatible with the user.

In a fifth implementation, alone or in combination with one or more of the first through fourth implementations, the vehicle search platform may receive, from the user device and before identifying the set of vehicles to recommend to the user, vehicle preference data that identifies a set of one or more vehicle preferences of the user. In some implementations, when identifying the set of vehicles to recommend, the vehicle search platform may identify the set of vehicles to recommend to the user based on the vehicle preference data.

In a sixth implementation, alone or in combination with one or more of the first through fifth implementations, the vehicle search platform may receive, before identifying the set of vehicles, object rendering data for a 3-D rendering of a car seat for a child. In some implementations, when identifying the set of vehicles to recommend the vehicle search platform may identify the set of vehicles to recommend based on the object rendering data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
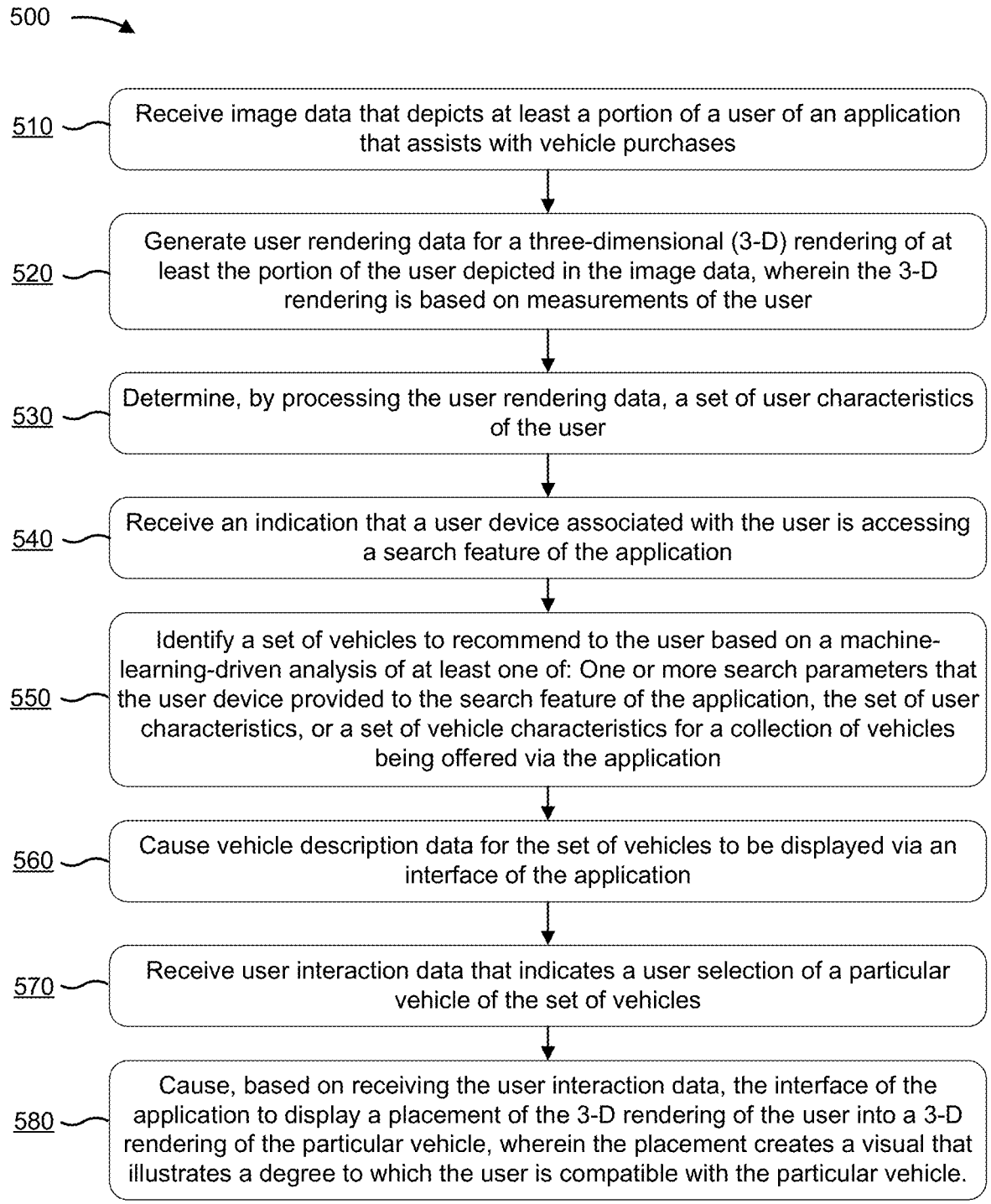

FIG. 5 is a flow chart of an example process 500 for using augmented reality (AR) to assist a user in searching for a vehicle. In some implementations, one or more process blocks of FIG. 5 may be performed by a vehicle search platform (e.g., vehicle search platform 230). In some implementations, one or more process blocks of FIG. 5 may be performed by another device or a group of devices separate from or including the vehicle search platform, such as a user device (e.g., user device 210), a data storage device (e.g., data storage device 220), and/or the like.

As shown in FIG. 5, process 500 may include receiving image data that depicts at least a portion of a user of an application that assists with vehicle purchases (block 510). For example, the vehicle search platform (e.g., using computing resource 235, processor 320, memory 330, storage component 340, input component 350, communication interface 370, and/or the like) may receive image data that depicts at least a portion of a user of an application that assists with vehicle purchases, as described above.

As further shown in FIG. 5, process 500 may include generating user rendering data for a three-dimensional (3-D) rendering of at least the portion of the user depicted in the image data, wherein the 3-D rendering is based on measurements of the user (block 520). For example, the vehicle search platform (e.g., using computing resource 235, processor 320, memory 330, storage component 340, and/or the like) may generate user rendering data for a three-dimensional (3-D) rendering of at least the portion of the user depicted in the image data, as described above. In some implementations, the 3-D rendering is based on measurements of the user.

As further shown in FIG. 5, process 500 may include determining, by processing the user rendering data, a set of user characteristics of the user (block 530). For example, the vehicle search platform (e.g., using computing resource 235, processor 320, memory 330, storage component 340, and/or the like) may determine, by processing the user rendering data, a set of user characteristics of the user, as described above.

As further shown in FIG. 5, process 500 may include receiving an indication that a user device associated with the user is accessing a search feature of the application (block 540). For example, the vehicle search platform (e.g., using computing resource 235, processor 320, memory 330, storage component 340, input component 350, communication interface 370, and/or the like) may receive an indication that a user device associated with the user is accessing a search feature of the application, as described above.

As further shown in FIG. 5, process 500 may include identifying a set of vehicles to recommend to the user based on a machine-learning-driven analysis of at least one of: one or more search parameters that the user device provided to the search feature of the application the set of user characteristics, or and a set of vehicle characteristics for a collection of vehicles being offered via the application (block 550). For example, the vehicle search platform (e.g., using computing resource 235, processor 320, memory 330, storage component 340, and/or the like) may identify a set of vehicles to recommend to the user based on a machine-learning-driven analysis of at least one of: one or more search parameters that the user device provided to the search feature of the application, the set of user characteristics, or and a set of vehicle characteristics for a collection of vehicles being offered via the application, as described above.

As further shown in FIG. 5, process 500 may include causing vehicle description data for the set of vehicles to be displayed via an interface of the application (block 560). For example, the vehicle search platform (e.g., using computing resource 235, processor 320, memory 330, storage component 340, input component 350, output component 360, communication interface 370, and/or the like) may cause vehicle description data for the set of vehicles to be displayed via an interface of the application, as described above.

As further shown in FIG. 5, process 500 may include receiving user interaction data that indicates a user selection of a particular vehicle of the set of vehicles (block 570). For example, the vehicle search platform (e.g., using computing resource 235, processor 320, memory 330, storage component 340, input component 350, communication interface 370, and/or the like) may receive user interaction data that indicates a user selection of a particular vehicle of the set of vehicles, as described above.

As further shown in FIG. 5, process 500 may include causing, based on receiving the user interaction data, the interface of the application to display a placement of the 3-D rendering of the user into a 3-D rendering of the particular vehicle, wherein the placement creates a visual that illustrates a degree to which the user is compatible with the particular vehicle (block 580). For example, the vehicle search platform (e.g., using computing resource 235, processor 320, memory 330, storage component 340, input component 350, output component 360, communication interface 370, and/or the like) may cause, based on receiving the user interaction data, the interface of the application to display a placement of the 3-D rendering of the user into a 3-D rendering of the particular vehicle, as described above. In some implementations, the placement may create a visual that illustrates a degree to which the user is compatible with the particular vehicle.

Process 500 may include additional implementations, such as any single implementation or any combination of implementations described below and/or in connection with one or more other processes described elsewhere herein.

In a first implementation, the visual may illustrate the 3-D rendering of the user sitting on a seat within the 3-D rendering of the particular vehicle. In a second implementation, alone or in combination with the first implementation, the set of user characteristics may include at least one of: a height of the user, a width of one or more body parts of the user, or a length of the one or more body parts of the user. In some implementations, the set of vehicle characteristics for the particular vehicle include at least one of: a first seat placement, that is associated with a minimum seat extension distance, for one or more seats included within the particular vehicle, a second seat placement, that is associated with a maximum seat extension distance, for the one or more seats included in the particular vehicle, a distance between a first point of the one or more seats and a second point of a ceiling of the particular vehicle.

In a third implementation, alone or in combination with one or more of the first and second implementations, the vehicle search platform may integrate the set of user characteristics into the search feature to permit the search feature to offer a set of search parameters that are customized to the user. In a fourth implementation, alone or in combination with one or more of the first through third implementations, the vehicle search platform, when identifying the set of vehicles to recommend, may analyze the set of user characteristics and the set of vehicle characteristics using a data model that has been trained to use machine learning to identify compatible vehicles based on vehicles purchased by other users that have similar characteristics to the user. The data model may output a set of scores that indicate likelihoods of the collection of vehicles being compatible with the user. Additionally, the vehicle search platform may identify the set of vehicles based on the set of scores.

In a fifth implementation, alone or in combination with one or more of the first through fourth implementations, the vehicle search platform may identify, from the user device and before identifying the set of vehicles to recommend to the user, vehicle preference data that identifies a set of vehicle preferences of the user. In some implementations, when identifying the set of vehicles to recommend, the vehicle search platform may identify the set of vehicles to recommend to the user based on the machine-learning-driven analysis. In some implementations, the machine-learning-driven analysis may include analyzing the vehicle preference data.

In a sixth implementation, alone or in combination with one or more of the first through fifth implementations, the vehicle search platform may receive, before identifying the set of vehicles to recommend, object rendering data for a 3-D rendering of a car seat for a child. In some implementations, when identifying the set of vehicles to recommend, the vehicle search platform identify the set of vehicles to recommend based on the object rendering data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
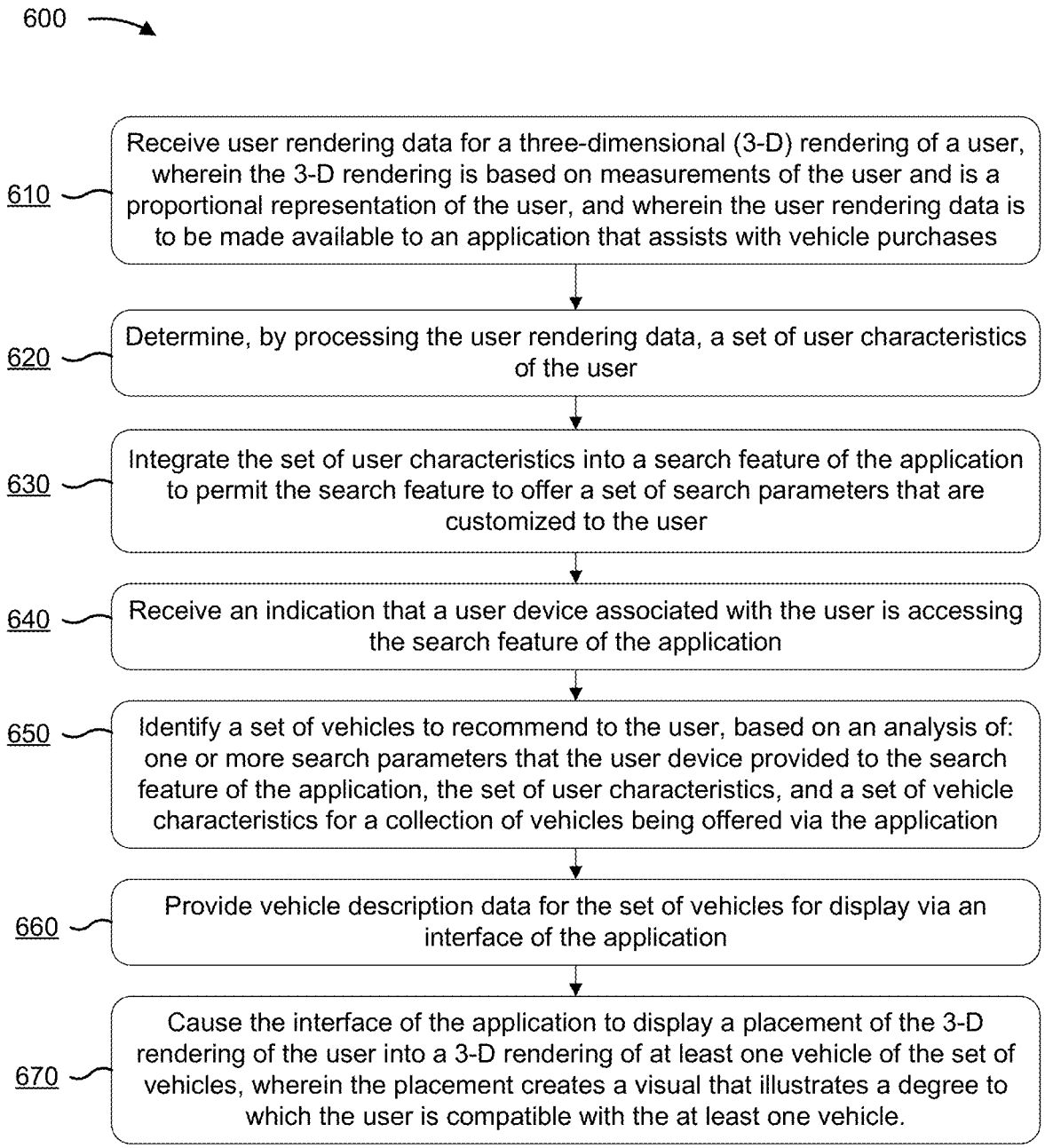

FIG. 6 is a flow chart of an example process 600 for using augmented reality (AR) to assist a user in searching for a vehicle. In some implementations, one or more process blocks of FIG. 6 may be performed by a vehicle search platform (e.g., vehicle search platform 230). In some implementations, one or more process blocks of FIG. 6 may be performed by another device or a group of devices separate from or including the vehicle search platform, such as a user device (e.g., user device 210), a data storage device (e.g., data storage device 220), and/or the like.

As shown in FIG. 6, process 600 may include receiving user rendering data for a three-dimensional (3-D) rendering of a user, wherein the 3-D rendering is based on measurements of the user and is a proportional representation of the user, and wherein the user rendering data is to be made available to an application that assists with vehicle purchases (block 610). For example, the vehicle search platform (e.g., using computing resource 235, processor 320, memory 330, storage component 340, input component 350, communication interface 370, and/or the like) may receive user rendering data for a three-dimensional (3-D) rendering of a user, as described above. In some implementations, the 3-D rendering may be based on measurements of the user and may be a proportional representation of the user. In some implementations, the user rendering data may be made available to an application that assists with vehicle purchases.

As further shown in FIG. 6, process 600 may include determining, by processing the user rendering data, a set of user characteristics of the user (block 620). For example, the vehicle search platform (e.g., using computing resource 235, processor 320, memory 330, storage component 340, and/or the like) may determine, by processing the user rendering data, a set of user characteristics of the user, as described above.

As further shown in FIG. 6, process 600 may include integrating the set of user characteristics into a search feature of the application to permit the search feature to offer a set of search parameters that are customized to the user (block 630). For example, the vehicle search platform (e.g., using computing resource 235, processor 320, memory 330, storage component 340, and/or the like) may integrate the set of user characteristics into a search feature of the application to permit the search feature to offer a set of search parameters that are customized to the user, as described above.

As further shown in FIG. 6, process 600 may include receiving an indication that a user device associated with the user is accessing the search feature of the application (block 640). For example, the vehicle search platform (e.g., using computing resource 235, processor 320, memory 330, storage component 340, input component 350, communication interface 370, and/or the like) may receive an indication that a user device associated with the user is accessing the search feature of the application, as described above.

As further shown in FIG. 6, process 600 may include identifying a set of vehicles to recommend to the user, based on an analysis of: one or more search parameters that the user device provided to the search feature of the application, the set of user characteristics, and a set of vehicle characteristics for a collection of vehicles being offered via the application (block 650). For example, the vehicle search platform (e.g., using computing resource 235, processor 320, memory 330, storage component 340, and/or the like) may identify a set of vehicles to recommend to the user, based on an analysis of: one or more search parameters that the user device provided to the search feature of the application, the set of user characteristics, and a set of vehicle characteristics for a collection of vehicles being offered via the application, as described above.

As further shown in FIG. 6, process 600 may include providing vehicle description data for the set of vehicles for display via an interface of the application (block 660). For example, the vehicle search platform (e.g., using computing resource 235, processor 320, memory 330, storage component 340, output component 360, communication interface 370, and/or the like) may provide vehicle description data for the set of vehicles for display via an interface of the application, as described above.

As further shown in FIG. 6, process 600 may include causing the interface of the application to display a placement of the 3-D rendering of the user into a 3-D rendering of at least one vehicle of the set of vehicles, wherein the placement creates a visual that illustrates a degree to which the user is compatible with the at least one vehicle (block 670). For example, the vehicle search platform (e.g., using computing resource 235, processor 320, memory 330, storage component 340, input component 350, output component 360, communication interface 370, and/or the like) may cause the interface of the application to display a placement of the 3-D rendering of the user into a 3-D rendering of at least one vehicle of the set of vehicles, as described above. In some implementations, the placement may create a visual that illustrates a degree to which the user is compatible with the at least one vehicle.

Process 600 may include additional implementations, such as any single implementation or any combination of implementations described below and/or in connection with one or more other processes described elsewhere herein.

In a first implementation, the vehicle search platform may receive, before receiving the user rendering data, a particular indication that the user device created an account for the application. In some implementations, the vehicle search platform may provide, to the user device, a set of instructions that describe how to capture image data or video data that depicts the user in a manner that will be sufficient for generating the 3-D rendering of the user. In some implementations, the set of instructions may allow the user device to generate and provide the user rendering data to the vehicle search platform.

In a second implementation, alone or in combination with the first implementation, the visual illustrates the 3-D rendering of the user sitting on a seat within the 3-D rendering of the particular vehicle. In a third implementation, alone or in combination with one or more of the first and second implementations, the vehicle search platform, when identifying the set of vehicles to recommend, may analyze the set of user characteristics and the set of vehicle characteristics using a data model that has been trained using one or more machine learning techniques. The data model may output a set of scores that indicate likelihoods of the collection of vehicles being compatible with the user identify the set of vehicles based on the set of scores. Additionally, the vehicle search platform may identify the set of vehicles based on the set of scores.

In a fourth implementation, alone or in combination with one or more of the first through third implementations, the vehicle search platform may receive, from the user device and before identifying the set of vehicles to recommend to the user, vehicle preference data that identifies a set of vehicle preferences of the user. In some implementations, when determining the set of vehicles to recommend, the vehicle search platform may identify the set of vehicles to recommend to the user based on the vehicle preference data.

In a fifth implementation, alone or in combination with one or more of the first through fourth implementations, the vehicle search platform may receive, before identifying the set of vehicles, additional user rendering data for one or more 3-D renderings of one or more other users. In some implementations, when identifying the set of vehicles to recommend, the vehicle search platform may identify the set of vehicles to recommend based on the additional user rendering data.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, user rendering data for a three-dimensional (3-D) rendering of a user,
wherein the 3-D rendering of the user is a proportional representation of the user;
determining, by the device and by processing the user rendering data, a set of user characteristics of the user,
wherein the set of user characteristics includes at least one of:
a height of the user,
a width of one or more body parts of the user, or
a length of the one or more body parts of the user;
identifying, by the device, a set of vehicles to recommend to the user based on a machine learning driven analysis of:
the set of user characteristics, and
a set of vehicle characteristics for a collection of vehicles,
wherein the set of vehicle characteristics includes at least one of:
a first seat placement characteristic, that is associated with a minimum seat extension distance, for one or more seats included within the collection of vehicles,
a second seat placement characteristic, that is associated with a maximum seat extension distance, for the one or more seats included in the collection of vehicles, or
a distance between a first point of the one or more seats and a second point of one or more ceilings of one or more vehicles included in the collection of vehicles; and
causing, by the device, display of a placement of the 3-D rendering of the user in a 3-D rendering of a particular vehicle of the set of vehicles.

2. The method of claim 1, further comprising:
causing, while causing display of the placement of the 3-D rendering of the user, display of a score that indicates a likelihood of the particular vehicle being compatible with the user,
the likelihood of the particular vehicle being compatible with the user being based on the set of user characteristics and the set of vehicle characteristics.

3. The method of claim 1, further comprising:
providing, to a user device associated with the user, data that causes the user device to display the set of vehicles via an application operating on the user device; and
receiving, from the user device and based on a user selection made using the application, data identifying the particular vehicle; and
wherein causing display of the placement of the 3-D rendering of the user comprises:
causing display of the placement of the 3-D rendering of the user based on receiving the data identifying the particular vehicle.

4. The method of claim 1, further comprising:
receiving in-vehicle object data for a three-dimensional (3-D) rendering of an in-vehicle object; and
causing display of a placement of the 3-D rendering of the in-vehicle object in the 3-D rendering of the particular vehicle.

5. The method of claim 1, further comprising:
generating the 3-D rendering of the particular vehicle based on the set of vehicle characteristics.

6. The method of claim 1, further comprising:
generating a plurality of 3-D renderings of the particular vehicle based on the set of vehicle characteristics, the plurality of 3-D renderings of the particular vehicle being associated with different seat placement characteristics; and
selecting the 3-D rendering of the particular vehicle, from the plurality of 3-D renderings of the particular vehicle, based on the set of user characteristics.

7. The method of claim 1, further comprising:
generating the 3-D rendering of the user based on the user rendering data.

8. A device, comprising:
one or more memories; and
one or more processors, communicatively coupled to the one or more memories, configured to:
receive user rendering data for a three-dimensional (3-D) rendering of a user,
wherein the 3-D rendering of the user is a proportional representation of the user;
determine, by processing the user rendering data, a set of user characteristics of the user,
wherein the set of user characteristics includes at least one of:
a height of the user,
a width of one or more body parts of the user, or
a length of the one or more body parts of the user;
identify a set of vehicles to recommend to the user based on a machine learning driven analysis of:
the set of user characteristics, and
a set of vehicle characteristics for a collection of vehicles,
wherein the set of vehicle characteristics includes at least one of:
a first seat placement characteristic, that is associated with a minimum seat extension distance, for one or more seats included within the collection of vehicles,
a second seat placement characteristic, that is associated with a maximum seat extension distance, for the one or more seats included in the collection of vehicles, or
a distance between a first point of the one or more seats and a second point of one or more ceilings of one or more vehicles included in the collection of vehicles; and
cause display of a placement of the 3-D rendering of the user in a 3-D rendering of a particular vehicle of the set of vehicles.

9. The device of claim 8, wherein the one or more processors are further configured to:
cause, while causing display of the placement of the 3-D rendering of the user, display of a score that indicates a likelihood of the particular vehicle being compatible with the user,
the likelihood of the particular vehicle being compatible with the user being based on the set of user characteristics and the set of vehicle characteristics.

10. The device of claim 8, wherein the one or more processors are further configured to:
provide, to a user device associated with the user, data that causes the user device to display the set of vehicles via an application operating on the user device; and
receive, from the user device and based on a user selection made using the application, data identifying the particular vehicle; and
wherein the one or more processors, when causing display of the placement of the 3-D rendering of the user, are configured to:
cause display of the placement of the 3-D rendering of the user based on receiving the data identifying the particular vehicle.

11. The device of claim 8, wherein the one or more processors are further configured to:
receive in-vehicle object data for a three-dimensional (3-D) rendering of an in-vehicle object; and
cause display of a placement of the 3-D rendering of the in-vehicle object in the 3-D rendering of the particular vehicle.

12. The device of claim 8, wherein the one or more processors are further configured to:
generate the 3-D rendering of the particular vehicle based on the set of vehicle characteristics.

13. The device of claim 8, wherein the one or more processors are further configured to:
generate a plurality of 3-D renderings of the particular vehicle based on the set of vehicle characteristics, the plurality of 3-D renderings of the particular vehicle being associated with different seat placement characteristics; and
select the 3-D rendering of the particular vehicle, from the plurality of 3-D renderings of the particular vehicle, based on the set of user characteristics.

14. The device of claim 8, wherein the one or more processors are further configured to:
generate the 3-D rendering of the user based on the user rendering data.

15. A non-transitory computer-readable medium storing a set of instructions, the set of instructions comprising:
one or more instructions that, when executed by one or more processors of a device, cause the device to:
receive user rendering data for a three-dimensional (3-D) rendering of a user, wherein the 3-D rendering of the user is a proportional representation of the user;
determine, by processing the user rendering data, a set of user characteristics of the user,
wherein the set of user characteristics includes at least one of:
a height of the user,
a width of one or more body parts of the user, or
a length of the one or more body parts of the user;
identify a set of vehicles to recommend to the user based on a machine learning driven analysis of:
the set of user characteristics, and
a set of vehicle characteristics for a collection of vehicles,
wherein the set of vehicle characteristics includes at least one of:
a first seat placement characteristic, that is associated with a minimum seat extension distance, for one or more seats included within the collection of vehicles,
a second seat placement characteristic, that is associated with a maximum seat extension distance, for the one or more seats included in the collection of vehicles, or
a distance between a first point of the one or more seats and a second point of one or more ceilings of one or more vehicles included in the collection of vehicles; and
cause display of a placement of the 3-D rendering of the user in a 3-D rendering of a particular vehicle of the set of vehicles.

16. The non-transitory computer-readable medium of claim 15, wherein the one or more instructions further cause the device to:
cause, while causing display of the placement of the 3-D rendering of the user, display of a score that indicates a likelihood of the particular vehicle being compatible with the user,
the likelihood of the particular vehicle being compatible with the user being based on the set of user characteristics and the set of vehicle characteristics.

17. The non-transitory computer-readable medium of claim 15, wherein the one or more instructions further cause the device to:
provide, to a user device associated with the user, data that causes the user device to display the set of vehicles via an application operating on the user device; and
receive, from the user device and based on a user selection made using the application, data identifying the particular vehicle; and
wherein the one or more instructions, that cause the device to cause display of the placement of the 3-D rendering of the user, cause the device to:
cause display of the placement of the 3-D rendering of the user based on receiving the data identifying the particular vehicle.

18. The non-transitory computer-readable medium of claim 15, wherein the one or more instructions further cause the device to:
receive in-vehicle object data for a three-dimensional (3-D) rendering of an in-vehicle object; and
cause display of a placement of the 3-D rendering of the in-vehicle object in the 3-D rendering of the particular vehicle.

19. The non-transitory computer-readable medium of claim 15, wherein the one or more instructions further cause the device to:
generate the 3-D rendering of the particular vehicle based on the set of vehicle characteristics.

20. The non-transitory computer-readable medium of claim 15, wherein the one or more instructions further cause the device to:
generate a plurality of 3-D renderings of the particular vehicle based on the set of vehicle characteristics, the plurality of 3-D renderings of the particular vehicle being associated with different seat placement characteristics; and
select the 3-D rendering of the particular vehicle, from the plurality of 3-D renderings of the particular vehicle, based on the set of user characteristics.

* * * * *